US012385372B2

(12) United States Patent
Shaw

(10) Patent No.: US 12,385,372 B2
(45) Date of Patent: Aug. 12, 2025

(54) HYDRAULIC LOCKING MECHANISM FOR DOWNHOLE VALVE

(71) Applicant: Silverwell Technology Ltd., Cambridgeshire (GB)

(72) Inventor: Joel David Shaw, Houston, TX (US)

(73) Assignee: Silverwell Technology Ltd., Cambridgeshire (GB)

( * ) Notice: Subject to any disclaimer, the term of this patent is extended or adjusted under 35 U.S.C. 154(b) by 0 days.

(21) Appl. No.: 18/448,709

(22) Filed: Aug. 11, 2023

(65) Prior Publication Data

US 2024/0026762 A1 Jan. 25, 2024

Related U.S. Application Data

(63) Continuation-in-part of application No. 18/355,051, filed on Jul. 19, 2023, now Pat. No. 12,078,040.

(60) Provisional application No. 63/398,035, filed on Aug. 15, 2022, provisional application No. 63/390,853, filed on Jul. 20, 2022.

(51) Int. Cl.
*E21B 43/12* (2006.01)
*E21B 43/34* (2006.01)
*F15B 15/14* (2006.01)

(52) U.S. Cl.
CPC ........ *E21B 43/123* (2013.01); *F15B 15/1423* (2013.01)

(58) Field of Classification Search
CPC ................................ E21B 43/123; C09K 8/34
USPC .......................................................... 166/372
See application file for complete search history.

(56) References Cited

U.S. PATENT DOCUMENTS 1,884,548 A 10/1932 Alexander
2,952,268 A * 9/1960 Blum .................... E21B 43/123 137/155
3,016,844 A 1/1962 Vincent
(Continued)

FOREIGN PATENT DOCUMENTS

RU 2623750 C1 6/2017

OTHER PUBLICATIONS

International Search Report and Written Opinion for PCT Application No. PCT/GB2023/051917 dated Dec. 21, 2023. (STL037).
(Continued)

*Primary Examiner* — William D Hutton, Jr.
*Assistant Examiner* — Ashish K Varma
(74) *Attorney, Agent, or Firm* — Bracewell LLP; Keith R. Derrington

(57) ABSTRACT

A bi-directional valve with valve elements having compliant features biasing them together to maintain a sealing interface that defines a fluid communication barrier within the valve. Parting the valve elements from one another removes the sealing interface allow fluid communication across the valve elements. The valve includes a side port and a choke member that selectively blocks fluid flow through the valve when moved adjacent the side port and selectively opens the valve to fluid communication when moved away from the side port. The choke member remains adjacent the side port until the valve elements are spaced a distance apart greater than that at which valve erosion or fluid cavitation occurs. Also included with the valve are systems for counterbalancing forces exerted onto the valve from differential pressures.

15 Claims, 13 Drawing Sheets

(56) References Cited

U.S. PATENT DOCUMENTS

| | | | | | |
|---|---|---|---|---|---|
| 3,086,593 | A * | 4/1963 | Chitwood | ............. | E21B 43/123<br>137/155 |
| 3,722,527 | A * | 3/1973 | Blackwell | ............. | E21B 43/123<br>137/155 |
| 3,754,597 | A | 8/1973 | Garrett | | |
| 4,901,798 | A * | 2/1990 | Amani | .................. | E21B 34/101<br>166/324 |
| 6,705,404 | B2 | 3/2004 | Bosley | | |
| 6,715,550 | B2 | 4/2004 | Vinegar et al. | | |
| 6,758,277 | B2 | 7/2004 | Vinegar et al. | | |
| 7,896,082 | B2 | 3/2011 | Lake et al. | | |
| 8,985,227 | B2 | 3/2015 | Nikiforuk | | |
| 9,187,994 | B2 | 11/2015 | Themig | | |
| 9,284,816 | B2 | 3/2016 | Radford | | |
| 9,416,621 | B2 | 8/2016 | Mackenzie et al. | | |
| 10,294,763 | B2 | 5/2019 | Kleppa | | |
| 11,187,059 | B2 | 11/2021 | Churchill | | |
| 2014/0182855 | A1 | 7/2014 | Woodford | | |
| 2017/0016290 | A1 * | 1/2017 | Manwill | ................. | E21B 34/10 |
| 2018/0179855 | A1 | 6/2018 | Messa et al. | | |
| 2020/0318741 | A1 | 10/2020 | Zhang et al. | | |
| 2021/0108736 | A1 | 4/2021 | Park et al. | | |
| 2022/0056784 | A1 | 2/2022 | Culbertson et al. | | |

OTHER PUBLICATIONS

International Search Report and Written Opinion for PCT Application No. PCT/GB2023/052137 dated Nov. 9, 2023. (STL040).

Partial International Search Report for PCT Application No. PCT/GB2023/051917 dated Oct. 31, 2023. (STL037).

* cited by examiner

HYDRAULIC LOCKING MECHANISM FOR DOWNHOLE VALVE

CROSS-REFERENCE TO RELATED APPLICATIONS

This application claims priority to and the benefit of U.S. Provisional Application Ser. No. 63/398,035, filed Aug. 15, 2022, and is a continuation-in-part of U.S. application Ser. No. 18/355,051, filed Jul. 19, 2023, and which claimed priority to and the benefit of then U.S. Provisional Application Ser. No. 63/390,853, filed Jul. 20, 2022; the full disclosures of which are incorporated by reference herein in their entireties and for all purposes.

BACKGROUND OF THE INVENTION

1. Field of Invention

The present disclosure relates to pressure compensating a downhole valve actuator.

2. Description of Prior Art

Lift systems for unloading liquids from a well include pumps, such as electrical submersible pumps ("ESP"), which pressurize the liquid downhole and propel it up production tubing that carries the pressurized fluid to surface. Sucker rods and plunger lift pumps are also sometimes employed for lifting liquid from a well. In wells having an appreciable amount of gas mixed with the liquid a two-phase fluid may form and gas is sometimes separated from the fluid upstream of the ESP and routed to surface separately from the pressurized liquid. In some instances, compressor pumps are employed to pressurize the two-phase fluid to lift it to surface. A gas lift system is another type of artificial lift system, and that injects a lift gas, typically from surface, into production tubing installed in the well. The lift gas is usually directed into an annulus between the production tubing and sidewalls of the well, and from the annulus into the production tubing. Gas lift is commonly employed when pressure in a formation surrounding the well is insufficient to urge fluids to surface that are inside of the production tubing. By injecting sufficient lift gas into the production tubing, static head pressure of fluid inside the production tubing is reduced to below the pressure in the formation, so that the formation pressure is sufficient to push the fluids inside the production tubing to surface. Fluids that are usually in the production tubing are hydrocarbon liquids and gases produced from the surrounding formation. Sometimes these fluids are a result of forming the well or a workover and have been directed into the production tubing from the annulus.

The lift gas is typically transported to the well through a piping circuit on surface that connects a source of the lift gas to a wellhead assembly mounted over the well. Usually, valves are mounted on the production tubing for regulating the flow of lift gas into the production tubing from the annulus. Some types of these valves automatically open and close in response to designated pressures in the annulus and/or tubing, while other valve types are motor operated and controlled by signals delivered from a remote location. Shortcomings of many current valve designs include valve leakage from thermal effects and damage due to erosion, chatter, miscalibration to well conditions, or cavitation when throttling high pressure fluids. High pressures in wells from static head also create issues for actuating downhole valves;

such as large static loads applied to actuation components or increased pressure differentials across an actuator housing.

SUMMARY OF THE INVENTION

Disclosed is an example of a system for controlling a flow of fluid, and that includes a valve assembly, where the valve assembly is made up of a housing, a chamber in the housing having an inlet and an outlet, valve elements in the chamber each having a seal face, a fluid flow barrier in the chamber formed when seal faces on adjacent valve elements are brought into sealing contact with one another, forward and rearward compartments in the chamber that are on opposing sides of the fluid flow barrier, and a locking piston in the chamber having a side in pressure communication with the inlet and an opposing side in pressure communication with the outlet, the locking piston being selectively moved into a locking position and biased against an end of the first valve element that is in communication with the outlet. In one example the valve elements are a seat member and a plug assembly, and alternatively, a stem is included which has an end coupled to an end of the plug assembly. In this example, the system further optionally includes a motor attached to an end of the stem distal from the plug assembly, where energizing the motor moves the plug assembly towards and away from the seat member to selectively change the valve assembly between open and closed configurations; and where the locking piston is slidable with respect to the stem or is formed along a portion of the stem having an enlarged diameter. In an embodiment, an interface is defined where the plug seal face and seat member seal face are in sealing contact. In examples, pressure in the inlet exceeds pressure in the outlet. In an alternative, the valve assembly further includes a port formed radially through a sidewall of the housing adjacent the inlet, a port formed radially through the sidewall of the housing on a side of the locking piston distal from the fluid flow barrier, and a line connecting the ports. The valve assembly further optionally includes a port formed radially through the sidewall of the housing on a side of the locking piston distal from the fluid flow barrier, and where the inlet and the port are in communication to ambient. The seat member and plug assembly are optionally compliant with one another.

Another example of a system for controlling a flow of fluid is disclosed and that includes a valve assembly, where the valve assembly is made up of a housing, a chamber in the housing; valve elements in the chamber each having a seal face, a barrier in the chamber formed when seal faces on adjacent valve elements are brought into sealing contact with one another, compartments in the chamber that are adjacent one another and on opposing sides of the barrier, the compartments being at different pressures, and a locking piston in a one of the compartments that is at a lower pressure, the locking piston being selectively biased against an end of a one of the valve elements that is between the locking piston and the barrier. The locking piston is optionally biased against the one of the valve elements by a pressure differential between fluid flowing into the valve assembly and fluid flowing out of the valve assembly. In an alternative, a locking force is applied to the one of the valve elements from the locking piston that offsets an opposing force from a pressure differential that is applied to the one of the valve elements. The system optionally further includes an actuator and a stem attached to the actuator, where the locking piston is coupled with the stem, and where an end of the stem distal from the actuator is in selective abutting contact with the a one of the valve elements, and is selectively moveable away from the a one of the valve elements.

A method of controlling a flow of fluid is also disclosed, and that includes obtaining a valve assembly that comprises a housing, an inlet, an outlet, a valve seat, a plug member, and a stem connected between the plug member and an actuator, where the plug member is selectively in sealing contact with the valve seat to form a barrier to fluid flow through the valve assembly to define a closed configuration, and where the plug member is moveable away from the valve seat to form a passage between the valve seat and plug member to form a pathway for fluid flow through the housing and to define an open configuration. In this example the method also includes reducing a compressive load in the stem by biasing the plug member against the valve seat. The valve assembly of this example method optionally also includes a locking piston slideably disposed in the housing on a side of the plug member opposite the valve seat, where the compressive load in the stem is generated by a difference between pressures of inlet and outlet flows to and from the valve assembly, and where the plug member is biased against the valve seat by communicating the pressure of the inlet flow to a side of the locking piston opposite the plug member. In an example, the inlet flow enters the valve assembly through an opening in the housing that is located a side of the valve seat opposite the plug member, and where the pressure of the inlet flow is communicated to the side of the locking piston opposite the plug member through a port formed in a sidewall of the housing. The pressure of the inlet flow is optionally communicated to the side of the locking piston opposite the plug member through a line that is external to the housing. In one embodiment, the actuator is coupled to a motor, the inlet and outlet are in communication with portions in a wellbore separated by a tubular disposed in the wellbore, in this embodiment the method further includes energizing the motor to move the plug assembly away from the valve seat to reconfigure the valve assembly into the open configuration so that lift gas flows between the portions in the wellbore and through the valve assembly.

BRIEF DESCRIPTION OF DRAWINGS

Some of the features and benefits of the present invention having been stated, others will become apparent as the description proceeds when taken in conjunction with the accompanying drawings, in which.

Figure 1:
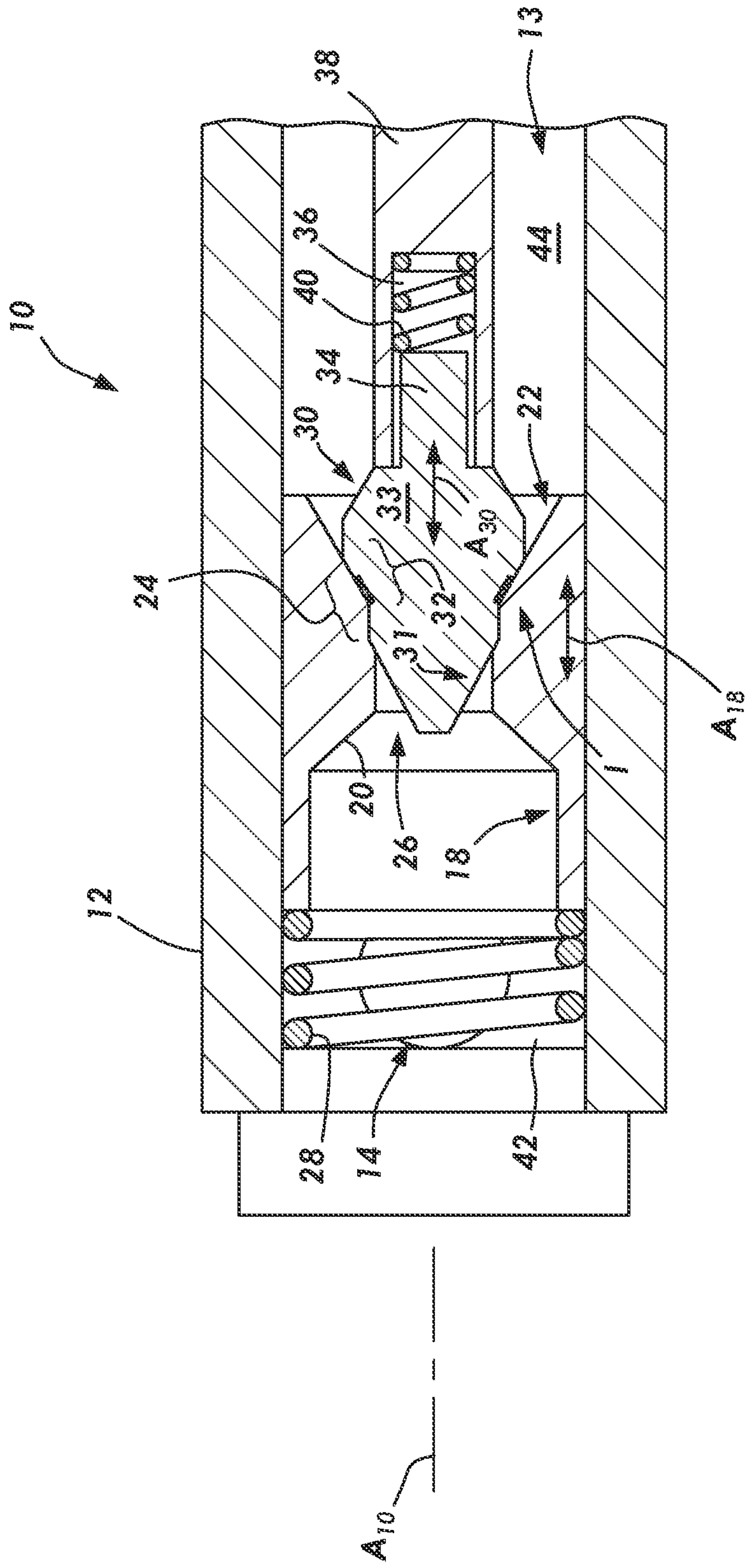
FIG. 1 is a side sectional view of an example of a valve in a closed configuration and with opposing sealing surfaces in contact.

While subject matter is described in connection with embodiments disclosed herein, it will be understood that the scope of the present disclosure is not limited to any particular embodiment. On the contrary, it is intended to cover all alternatives, modifications, and equivalents thereof.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of a cited magnitude. In an embodiment, the term "substantially" includes +/−5% of a cited magnitude, comparison, or description. In an embodiment, usage of the term "generally" includes +/−10% of a cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Shown in FIG. 1 is a side sectional view of an example of a valve assembly 10 having an annular valve housing 12, within the housing 12 is a chamber 13 that extends along an axis $A_{10}$ of the valve assembly 10. A side port 14 is formed radially through a sidewall of housing 12. Spaced axially from side port 14 is another side port 16 (FIG. 2) formed radially through the sidewall of housing 12. An edge of side port 16 proximate side port 14 is referred to as a forward portion 17. An annular seat member 18 is shown coaxially within the chamber 13 with a lengthwise portion proximate port 14 having a radial thickness that remains substantially constant along its length. A distance axially away from port 14 the radial thickness of the seat member 18 increases to define a forward face 20 having a generally frusto-conical configuration. Axially past the forward face 20, the radial thickness of seat member 18 reduces along its axial length to form a rearward face 22 shown having a frusto-conical configuration. A seal face 24 is defined along a lengthwise portion of the rearward face 22, and also has a frusto-conical profile. In alternatives, seal face 24 has other profiles, such as a generally spherical profile or other standard configurations. A passage 26 extends axially through the seat member 18, an outer diameter of passage 26 is defined by the inner diameter of seat member 18.

In the example shown, a spring 28 is disposed within the chamber 13 and has a rearward end abutting a forward terminal end of seat member 18 that faces towards the port 14. Spring 18 applies a biasing force against member 18 in a rearward direction axially away from side port 14. Also included with valve assembly 10 is a plug 30 having a conically shaped outer surface, the outer diameter of which increases with distance from the port 14. A forward portion 31 of plug 30 is shown inserted within passage 26. A seal face 32 is formed on an outer surface of forward portion 31 that is shaped complimentary to seal face 24; in the example of FIG. 1, seal faces 24, 32 are in sealing contact with one another to form a sealing interface I that is a barrier to fluid communication between the member 18 and plug 30. Example materials on seal faces 24, 32 that form the sealing interface I include elastomers, thermoplastics, metals, like materials, and combinations. On a rearward end 33 of plug 30 is a cylindrically shaped spindle 34 shown projecting axially away from forward portion 31 and extending into a recess 36, which is formed axially within a forward end of an elongated actuator stem 38 disposed within chamber 13. A spring 40 is provided in recess 36 that exerts a biasing force urging the plug 30 in a forward direction and against seat member 18. In the embodiment of FIG. 1, and as described in more detail below, spring 40 is strategically formed or selected to have a designated spring constant.

Valve assembly 10 illustrated in FIG. 1 is in a closed configuration, which in an example is defined by opposing seal faces 24, 32 being in sealing contact and that forms interface I along the faces 24, 32 that circumscribes the respective inner and outer surfaces of passage 26 and plug 30. In a non-limiting example of operation, the valve assembly 10 is put into the closed configuration by exerting an axial force onto one or both of seat member 18 and plug 30 to bring seal faces 24, 32 into sealing contact and form interface I; the axial force is optionally provided by moving actuator stem 38 towards seat member 18. In an alternative one or both springs 28, 40 become at least partially compressed by putting valve assembly 10 in the closed configuration. Seat member 18 and plug 30 are maintained in sealing contact with one another by the combination of spring 28 which biases the seat member 18 in the direction of plug 30, and spring 40 which biases plug 30 in the direction of seat member 18. As illustrated by arrow $A_{18}$ and arrow $A_{30}$, seat member 18 and plug 30 are each selectively movable along axis $A_{10}$. Adjacent portions of chamber 13 on opposing sides of interface I define compartments 42, 44. In addition to blocking fluid communication across interface I when faces 24, 32 are in sealing contact, examples exist in which interface I forms a pressure barrier to pressure isolate compartments 42, 44 from one another.

For the purposes of discussion herein, the term compliant or compliancy, regarding seal elements in a valve, describes a seal element or elements that in response to displacement (such as from a thermal effect) of itself or a corresponding seal element, repositions or can be repositioned to maintain sealing contact with the corresponding seal element. In a non-limiting example, the seat member 18 and plug 30 are referred to as valve elements and that provide a dual compliant functionality, the springs 28, 40 illustrate examples of dual biasing means. An advantage of the valve assembly 10 having the dual compliant valve elements with the dual biasing means is that sealing contact between plug 30 and seat member 18 is maintained continuously when the valve assembly 10 is put into the closed configuration and is not compromised by thermal effects of material expansion or contraction that might could cause leakage or sealing surface separation in a valve with non-compliant elements.

Figure 2:
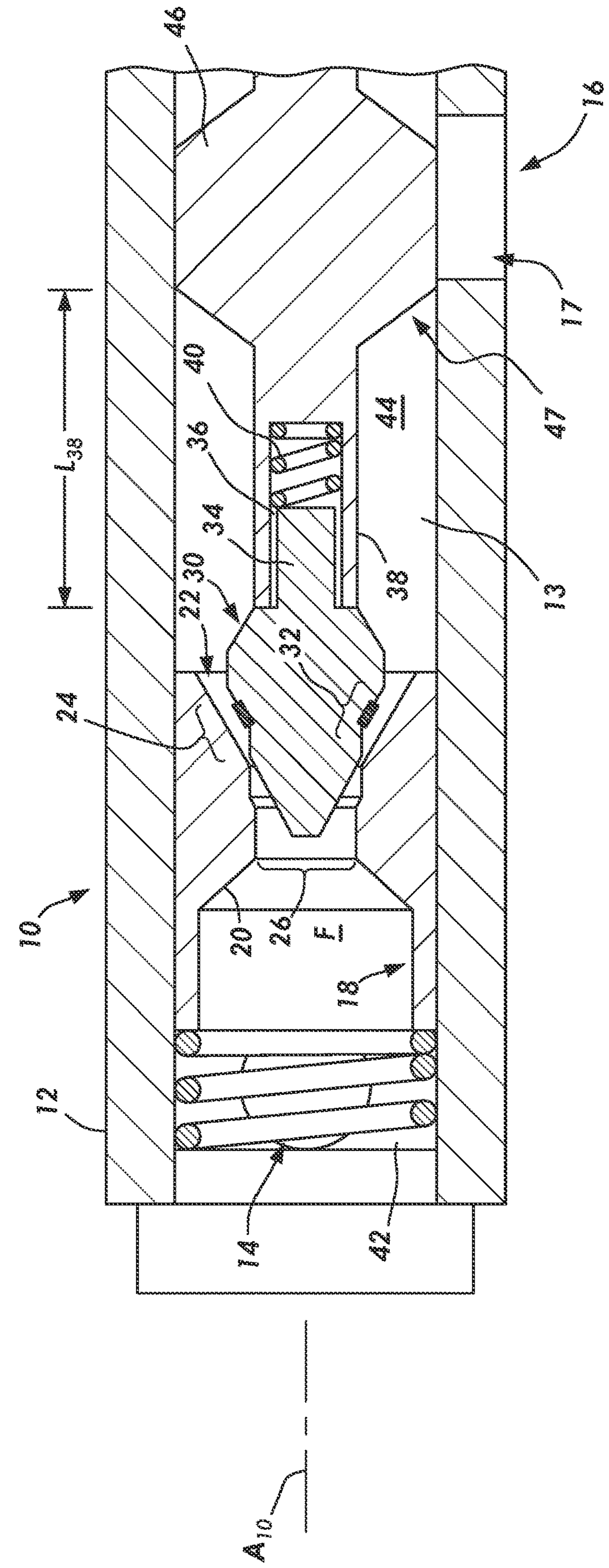
FIG. 2 is a side sectional view of the valve of FIG. 1 in the open configuration and with the opposing sealing surfaces spaced away from one another.

Referring now to FIG. 2, plug 30 is moved axially away from seat member 18 to space apart the seal faces 24, 32, which removes the interface I (FIG. 1) and allows fluid communication between compartments 42, 44. Further shown in FIG. 2 is a choke member 46 integrally formed onto actuator stem 38 a distance $L_{38}$ from plug 30. For the purposes of reference, an end of choke member 46 proximate plug 30 is referred to as a forward end 47. In the illustrated example an outer diameter of choke member 46 is substantially equal to an inner diameter of chamber 13, which forms an interface along where an outer surface of choke member 46 and an inner surface of the side wall of housing 12 are in contact with one another. This contact interface between choke member 46 and inner sidewall of housing 12 defines a fluid flow barrier between chamber 13 and side port 16. In this example, the fluid flow barrier between side port 16 by choke member 46 substantial blocks fluid flow through the valve assembly 10 and between ports 14, 16. In the example shown, by selectively spacing choke member 46 a distance $L_{38}$ from plug 30, fluid F in valve assembly 10 remains substantially static inside chamber 13 as plug 30 is being separated from and moved away from seat member 18.

Figure 3:
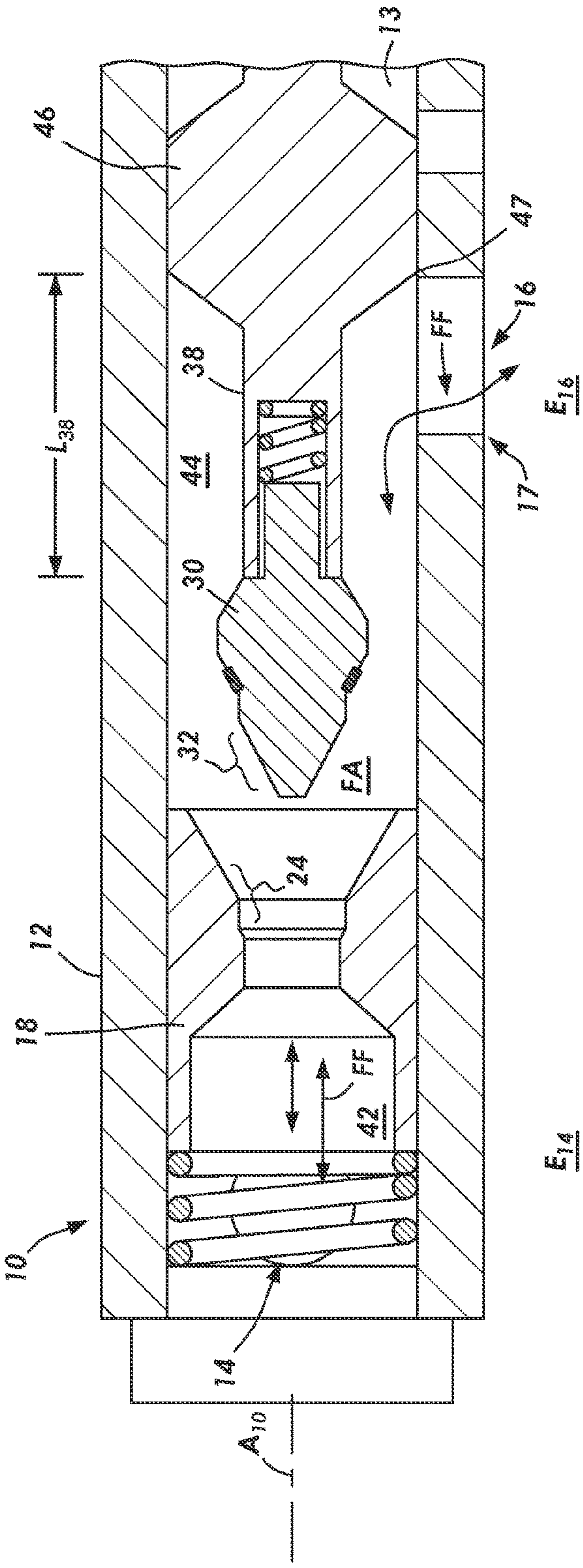
FIG. 3 is a side sectional view of the valve of FIG. 2 in an open configuration and with the opposing sealing surfaces spaced farther away from one another.

Referring now to FIG. 3, plug 30, stem 38, and choke member 46 are shown in a subsequent step of operation in which all have moved laterally farther away from seat member 18. In the example shown, a portion of choke member 46 is positioned forward of side port 16, so that no obstacles to fluid flow are between side port 16 and chamber 13. In the example of FIG. 3, environments $E_{14}$, $E_{16}$ are ambient to side ports 14, 16; in alternatives environments $E_{14}$, $E_{16}$ are separate and distinct from one another and/or are at different pressures. In an example sequence of operation occurring between FIG. 2 and FIG. 3, forward end 47 of choke member 46 moves rearward of forward portion 17 of port 16 to partially expose port 16 to chamber 13 to provide fluid communication between ports 14, 16 through chamber 13. Providing fluid communication between ports 14, 16 initiates the stream of flowing fluid FF through ports 14, 16, the volumetric flow of the fluid flow stream increases as the choke member 46 is moved farther rearward to expose a greater area of the port 16 to the chamber 13 to increase a cross sectional area of the fluid flow path through the valve assembly 10. In examples when pressure in environment $E_{14}$ exceeds that of environment $E_{16}$, so that a fluid FF in environment $E_{14}$ enters chamber 13 through side port 14, flows as a stream of flowing fluid FF through chamber 13, and exits chamber 13 through side port 16. In examples when pressure in environment $E_{16}$ exceeds that of environment $E_{14}$, so that a fluid FF in environment $E_{16}$ enters chamber 13 through side port 16, flows as a stream of flowing fluid FF through chamber 13, and exits chamber 13 through side port 14. In an example, the magnitude of distance L 38 is strategically set so that seal faces 24, 32 are at least a threshold distance apart to create a flow area FA between seal faces 24, 32 of adequate dimensions so that a velocity of flowing fluid FF passing through the flow area FA is below a magnitude at which erosion or cavitation of either seal face 24, 32 occurs or could occur. An additional advantage of the present disclosure is that a barrier to fluid flow through the valve assembly 10 is set a distance away from the sealing interface I and seal faces 24, 32 and that prevents cavitation or erosion to the seal faces 24, 32 as high-velocity jets or cavitations can collapse before reaching the seal faces 24, 32. In a non-limiting example of operation, a determination of the flow area FA that is above a threshold magnitude to avoid erosion or cavitation in seal faces 24, 32 is dependent on the flowing fluid FF, such as its characteristics, properties, and constituents, and conditions of the flowing fluid FF, such as its temperature, pressure, and expected pressure differential of the flowing fluid FF through the valve assembly 10. It is believed it is within the capabilities of one skilled in the art to determine values of a threshold flow area FA and threshold distance between opposing sealing faces 24, 32 at which cavitation or erosion of components in the valve assembly 10 does not occur. Example resources for determining these values include API Spec 19G2 and Crane Technical Paper No. 410, both of which are incorporated by reference herein in their entireties and for all purposes.

Figure 3A:
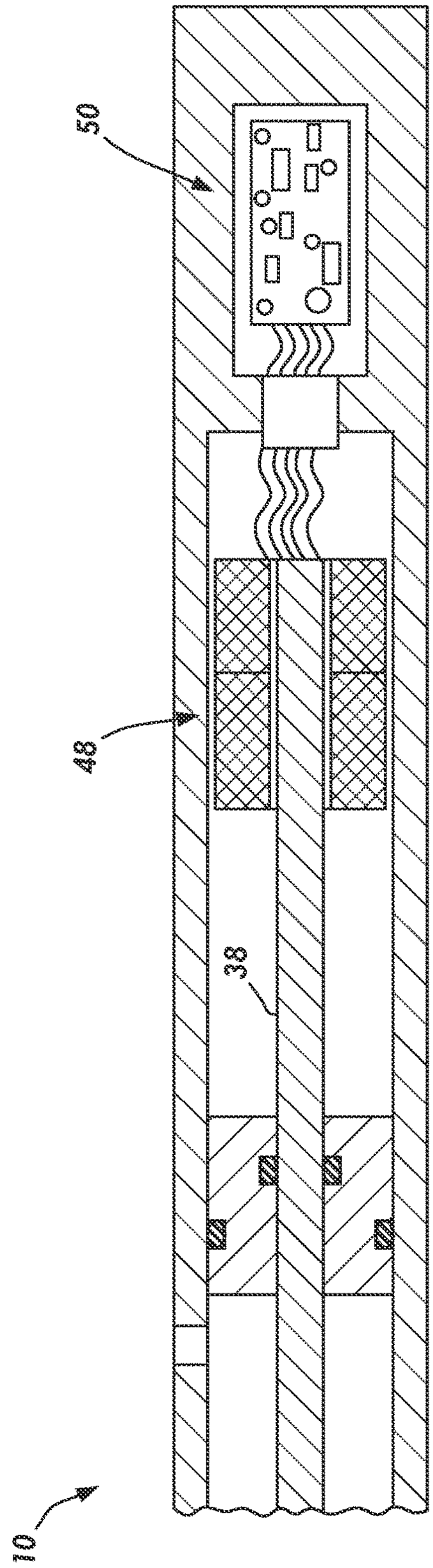
FIG. 3A is a schematic example of a processor and actuator coupled with the valve assembly of FIG. 1.

In the example shown in FIG. 3A, valve assembly 10 is coupled with an actuator 48, which provides an actuating force for moving onto valve stem 38. Included in FIG. 3A is a processor 50 disposed within a portion of housing 12 spaced away from valve assembly 10. Processor 50 is in communication with actuator 48 and selectively provides command signals for controlling operation of actuator 48 and opening and closing of valve assembly 10. In embodiments, the processor 50 is part of an information handling system, and further includes memory accessible by the processor, nonvolatile storage area accessible by the processor, and logics for performing each of the steps described herein.

Figure 3B:
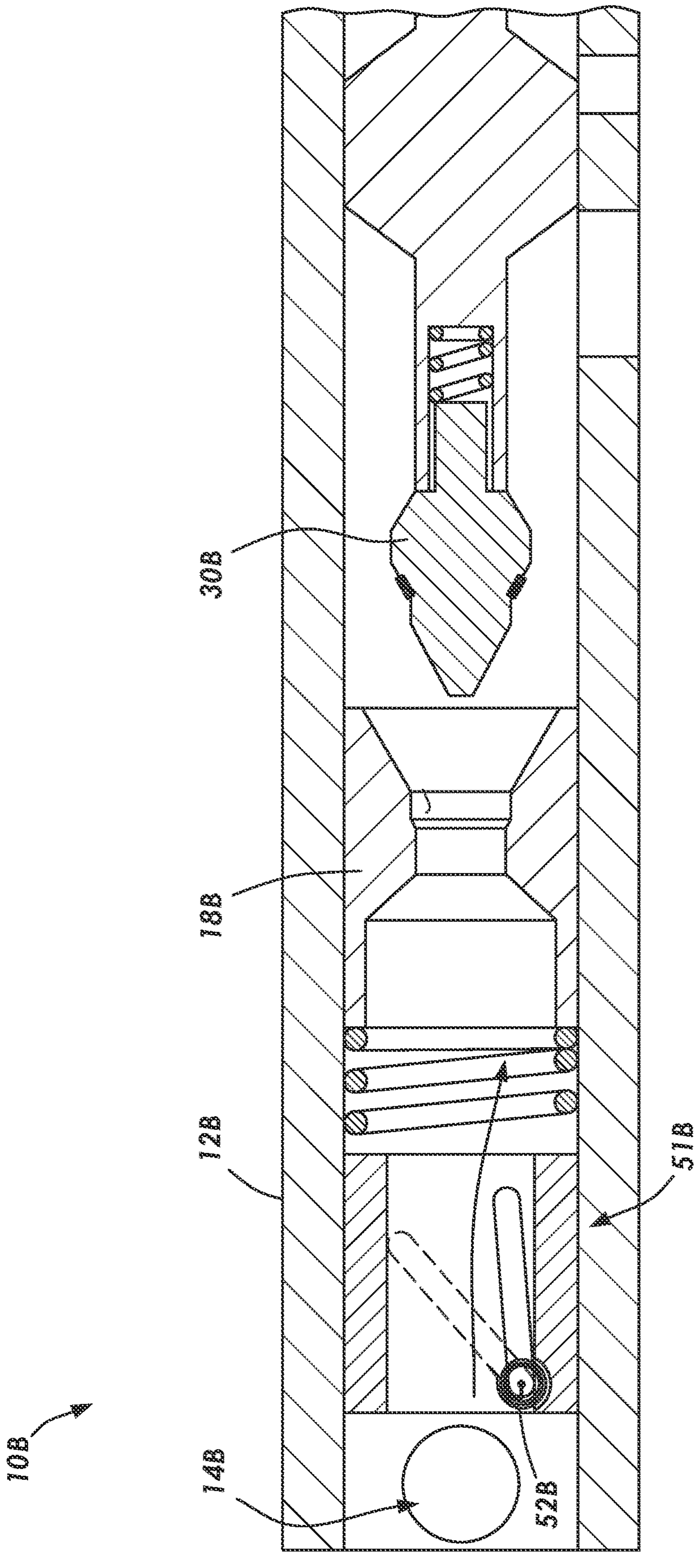
FIG. 3B is an alternate embodiment of the valve assembly of FIG. 2 that includes a check valve.

An alternative example of a valve assembly 10B is shown in a side sectional view in FIG. 3B, and having a check valve 51B with a spring 52B inside housing 12B on a side of seat member 18B opposite plug 30B. In this example, check valve 51B is between side port 14B and seat member 18B. In a non-limiting example of use of valve assembly 10B, check valve 51B limits flow between ports 14B, 16B to a forward direction, and spring 52B biases valve 51B to a closed position when flow is in a rearward direction to prevent dual flow through the valve assembly 10B.

Figure 4:
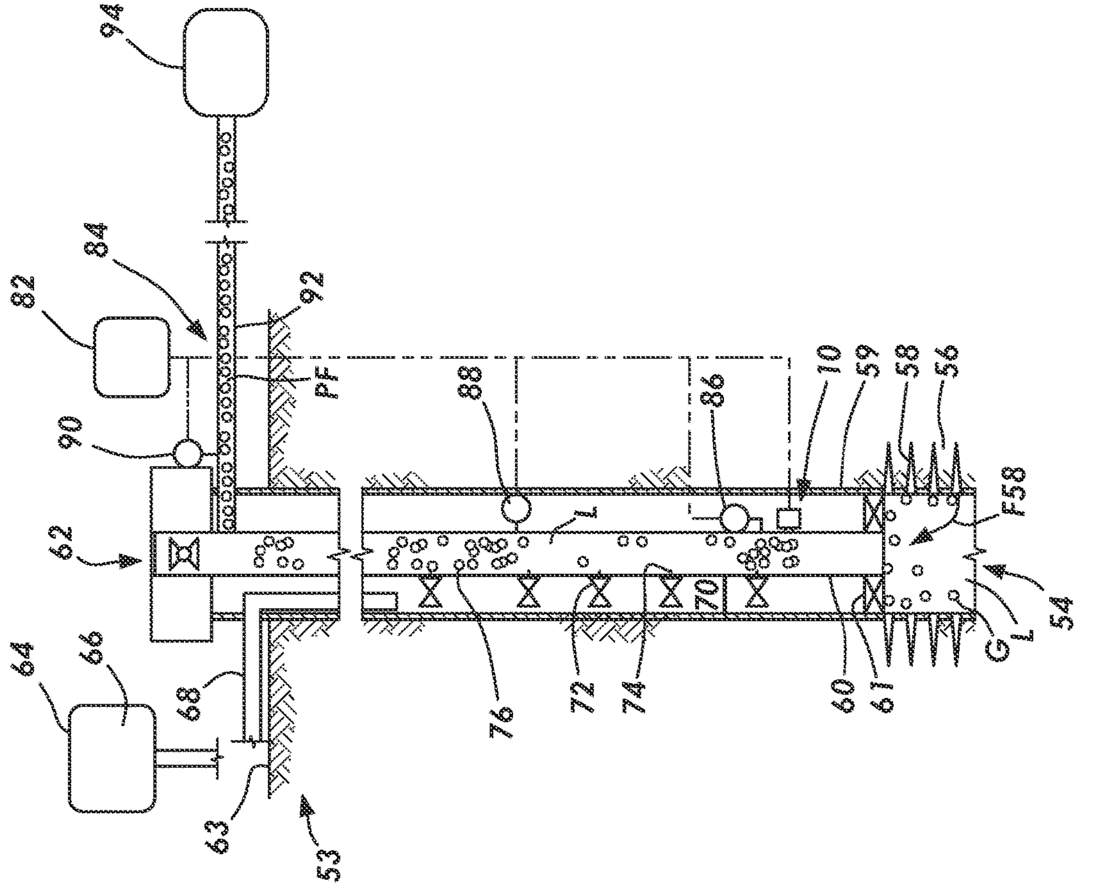
FIG. 4 is a side section view of an example of lift gas flowing from an annulus, through the valve of FIG. 1, and into production tubing.

Shown in a side partial sectional view in FIG. 4 is an example of valve 10 included in a gas lift system 52 being used for lifting liquid L from a well 54. Well 54 is shown intersecting a subterranean formation 56 and having perforations 58 that extend radially outward from the well 54 into the formation 56. Perforations 58 also intersect casing 59 that lines the well 54. Production tubing 60 is inserted within the casing 59. Fluid $F_{58}$ within formation 56 flows from the formation 56 through perforations 58 into the well 54, shown within a bottom of well 54 are liquid L and gas G components of fluid $F_{58}$. Pressure inside formation 56 forces fluid $F_{58}$ from the bottom of the well 54 upward into the production tubing 60. A packer 61 spans between the tubing 60 and casing 59 to force fluid $F_{58}$ into production tubing 60. An upper end of production tubing 60 connects to a wellhead assembly 62 shown on surface 63. Included with gas lift system 52 is a lift gas source 64 shown containing an amount of lift gas 66. Examples of a lift gas source 64 include adjacent wells, a gas line manifold, in-situ gas from another well (not shown), compressors, and other known or future developed sources of gas for use in a lift gas application. A line 68 attaches to a discharge of the lift gas source 64 and provides a conduit for transporting the lift gas 66 into an annulus 70 that is defined in a space between the production tubing 60 and casing 59. In a non-limiting example, valve 10 is configured so that environment $E_{14}$ (FIG. 3) is within, a part of, or in communication with annulus 70, and environment $E_{16}$ (FIG. 3) is within or is in communication with tubing 60; alternatively, valve 10 is configured so that environment $E_{16}$ is within, a part of, or in communication with annulus 70, and environment $E_{14}$ (FIG. 3) is within or is in communication with tubing 60.

Also included with the gas lift system 52 are a series of pressure operated valves 72 that are shown mounted to an exterior of the production tubing 60 at different depths within the well 54. In an example, valves 72 include surface controlled valves, pressure production valves, injection pressure valves, and optionally are inside production tubing 60. Valves 72 attach respectively to outlet ports 74 that extend through the sidewall of the production tubing 60 and in examples are automatically changeable between the open and closed configurations in response to pressure within the production tubing 60 or annulus 70. Illustrated in FIG. 4 is an example of injecting lift gas 66 from lift gas source 64 into production tubing 60 via valves 72 or valve 10. Lift gas bubbles 76 are shown inside liquid L in production tubing 60 that reduce a density of liquid L for promoting the upward flow of liquid L to the wellhead assembly 62. As shown, valve 10 connects to a controller 82 via a communication circuit 84 that carries signals between the controller 82 and valve 10, examples of the circuit 84 include electrically conductive members, fiber optics, hydraulic lines, and wireless telemetry. Included in this example are sensors 86, 88 in communication with the production tubing 60 and sensor 90 in communication with a production line 92. Sensors 86, 88, 90 optionally sense conditions inside the tubing 60, annulus 70, injection line 68, or production line 92, where example conditions include pressure, temperature, fluid properties, fluid composition and the like. In the example shown, fluid exiting wellhead assembly 62 and into production line 92 is referred to as production fluid PF, which includes liquid L, gas G, and optionally some amounts of lift gas 66. Production line 92 carries production fluid PF to a terminal location 94. In alternatives, terminal location 94 include one or more of a distribution center where production fluids from other wells are collected combined into a transmission line, a location where the production fluid PF is containerized for delivery elsewhere, or a processing facility where the production fluid PF is refined or conditioned.

In an example, side port 14 (FIG. 3) selectively provides communication between chamber 13 and ambient of the valve 10 and side port 16 provides selective communication between chamber 13 and tubing 60. Optionally, side port 16 selectively provides communication between chamber 13 and ambient of the valve 10 and side port 14 provides selective communication between chamber 13 and tubing 60. For the purposes of discussion herein, ambient defines the environment surrounding the housing 12.

Referring back to FIG. 3B, in examples in which port 16B is in communication with annulus 70 (FIG. 4) and valve assembly 10B is in an open configuration, fluid injection from annulus 70 to tubing 60 (FIG. 4) is selectively permitted through valve assembly 10B. As noted above, the biasing of spring 52B to close check valve 51B blocks reverse flow from tubing 60 to annulus 70, which prevents high pressure that may be present in the tubing 60 from communicating into the annulus 70.

Figure 5:
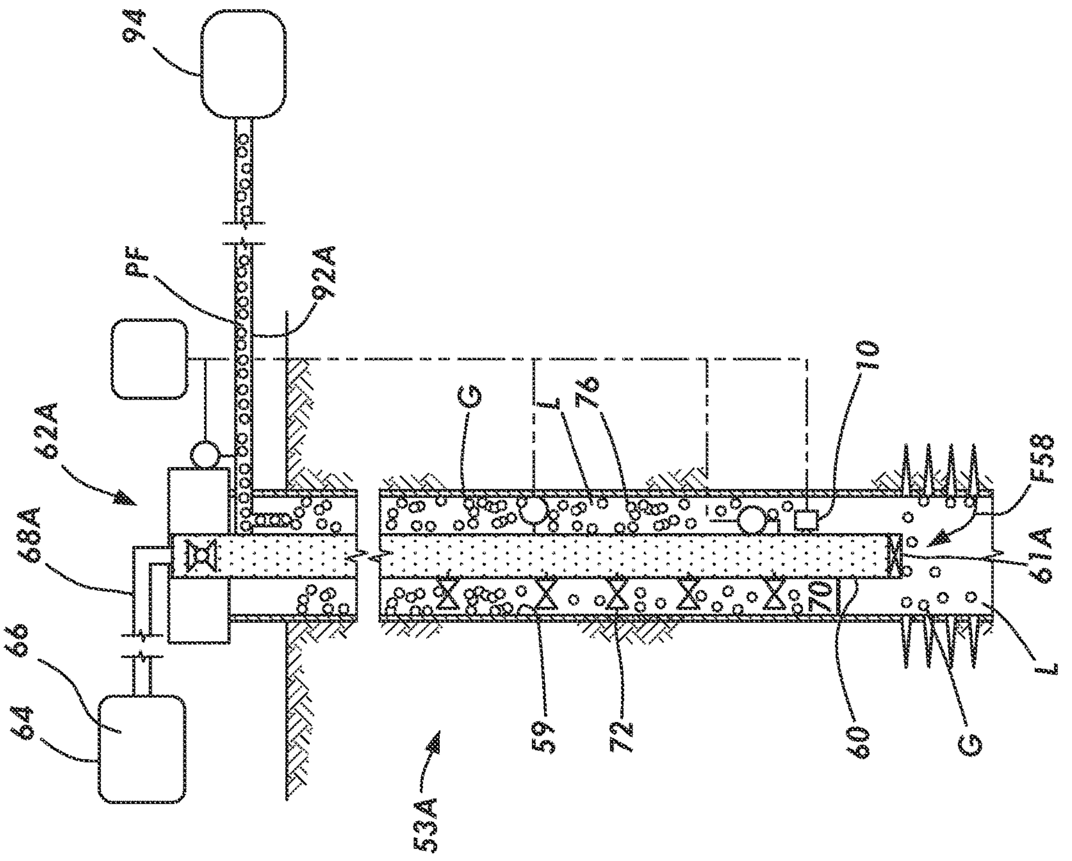
FIG. 5 is a side section view of an example of lift gas flowing from production tubing, through the valve of FIG. 1 and into an annulus.

Illustrated in a side sectional view in FIG. 5 is an alternative example of a lift gas system 52A in which fluid produced from well 54 $F_{58}$ is forced upwards within annulus 70. In this example lift gas 66 is directed into the production tubing 60 through line 68A. Lift gas 66 exits production tubing 60 through valve 10, through one or more of valves 72, or through both. In this example lift gas bubbles 76 form in the liquid L shown in annulus 70 between tubing 60 and casing 59; lift gas bubbles 76, gas G, and liquid L form at least a part of produced fluid PF shown being carried in production line 92A to terminal location 94.

Figure 6:
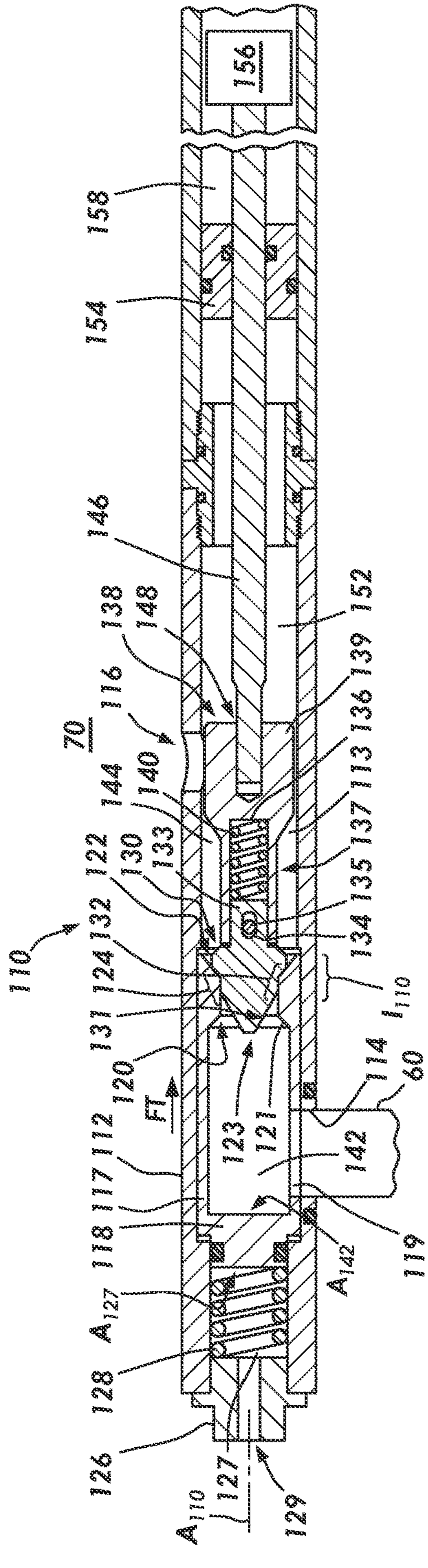
FIG. 6 is a side sectional view of an example of an alternate example of a valve assembly with a floating sleeve for reducing loads to a valve actuator.

Referring now to FIG. 6 shown in a side sectional view is an example of an embodiment of a valve assembly 110 having an annular valve housing 112 and within the housing 112 is a bore 113 that extends along an axis $A_{110}$ of the valve assembly 110. A side port 114 is formed radially through a sidewall of housing 112. Spaced axially rearward from side port 114 is another side port 116 formed radially through the sidewall of housing 112. In embodiments, port 114 is selectively in communication with tubing 60 while side port 116 is in communication with annulus 70 (FIG. 4), or vice versa. A sleeve-like floating chamber 117 is shown coaxially within the chamber 113, an axial end of floating chamber 117 is closed and which defines a bulkhead 118. A port 119 is formed through a radial sidewall of floating chamber 117 and is shown registered with port 114. An end of floating chamber 117 distal from bulkhead 118 is open, proximate the open end sidewalls of the floating chamber 117 are profiled obliquely radially inward to form a forward face 120 that faces bulkhead 118 and has a generally frusto-conical configuration. A distance axially rearward of the forward face 120 the sidewalls of the floating chamber 117 are profiled obliquely radially outward to form a rearward face 122, which has a frusto-conical configuration that faces away from bulkhead 118. In the example shown, the sidewalls of floating chamber 117 between faces 120, 122 have a substantially constant thickness and define an axial passage 123. A seal face 124 is defined along a lengthwise portion of the rearward face 122. In alternatives, seal face 124 has other profiles, such as a generally spherical profile or other standard configurations.

A cylindrically shaped end cap 126 is illustrated having a rearward portion inserted into a forward end of housing 112 and that defines a compartment 127 between end cap 126 and bulkhead 118. A flange circumscribes a mid-portion of end cap 126 and is shown abutting a forward end of housing 112. A spring 128 is shown disposed within the compartment 127 that applies a biasing force against floating chamber 117 in a direction axially away from end cap 126. In examples, floating chamber 117 is selectively reciprocatingly moveable within bore 113, similar to operation of seat member 18 (FIG. 1) described above. A passage 129 is shown formed axially through end cap 126, in the example of FIG. 6 passage 129 is in communication with annulus 70 (FIG. 4).

Still referring to FIG. 6, valve assembly 110 further includes a conically shaped plug 130 with a forward portion 131 shown inserted within passage 123. A seal face 132 is formed on an outer surface of forward portion 131 that is shaped complimentary to seal face 124. In the example of FIG. 6, seal faces 124, 132 are in sealing contact with one another to form a sealing interface $I_{110}$, which circumscribes the respective inner and outer surfaces of passage 123 and plug 130, and that is a barrier to fluid communication between the floating chamber 117 and plug 130. When seal faces 124, 132 are in sealing contact as shown in FIG. 6, valve assembly 110 is in a closed configuration. On a rearward end of plug 130 is a spindle 133 that projects axially away from forward end 131. A slot 134 is formed through spindle 133, slot 134 has and elongate side shown extending lengthwise along a portion of spindle 133. A pin 135 inserts into slot. Spindle 133 is a cylindrically shaped member and extends into a recess 136 formed axially within a forward section 137 of a choke member 138 shown disposed within bore 113. Forward section 137 is an elongate annular member shown disposed lengthwise in the bore 113 and generally aligned with axis $A_{110}$. In an example, pin 135 couples with section 137 and is in interfering contact with slot 134 to engage plug 130 with choke member 138. A rearward section 139 of choke member 138 is shown having an outer diameter that increases with distance from forward section 137 to form a frusto-conical portion, and past the frusto-conical section the rearward section 139 is substantially cylindrical and with an outer diameter largely the same as the inner diameter of the bore 113. A spring 140 is provided in a bottom of recess 136 and that as shown exerts a biasing force urging the plug 130 against floating chamber 117. A compartment 142 is formed inside floating chamber 117 between bulkhead 118 and interface $I_{110}$. Forward section 137 has an outer diameter less than an inner diameter of bore 113 so that a compartment 144 is formed in the annular space between bore 113 and forward section 137. Forward section 137 extends lengthwise between interface $I_{110}$ and where rearward section 139 transitions from a frusto-conical shape to a cylindrical shape. When seal faces 124, 132 are in sealing contact a pressure barrier is formed along interface $I_{110}$ that blocks pressure and fluid communication between compartments 142, 144.

Valve assembly 110 of FIG. 6 further includes an actuator stem 146, which is shown in bore 113 and that has an elongate length generally aligned with axis $A_{110}$. A forward end of stem 146 inserts into a bore 148 formed partially through rearward section 139. In the example shown, stem 146 is coupled to choke member 138, such as with a threaded connection in bore 148. An annular piston 154 is shown slidingly disposed in an annulus between stem 146 and inner surface of housing 112. In the example shown, a motor 156 connects to an end of stem 146 opposite section 139, and which selectively exerts an actuating force onto stem 146. Motor 156 is disposed in a compartment 158 that is optionally filled with a fluid, that in examples include one or more of a hydraulic or dielectric fluid. Fluid is optionally pressure equalized to ambient by exposing piston 154 to ambient pressure via port 116. Piston 154 is axially moveable within housing 112 and shown having seals for pressure isolating its forward and rearward ends from one another.

In examples, valve assembly 110 of FIG. 6 operates similar to valve assembly 10 of FIG. 1 as described above and is changed from a closed configuration to an open configuration by energizing motor 156, which in turn exerts an axial force onto actuator stem 146 and plug 130 to move actuator stem 146 and plug 130 rearwardly and separate seal faces 124, 132. Separating seal faces 124, 132 extends passage 123 to between seal faces 124, 132 and provides communication between compartments 142, 144 via passage 123. When in the open configuration choke member 138 is moved rearward so that all or a substantial portion of port 116 interfaces directly with compartment 144. Fluid from tubing 60 enters valve assembly 110 through registered ports 114, 119, flows into compartment 142, along passage 123, and exits into annulus 70 through port 116. Valve assembly 110 of FIG. 6 also has the advantage of reducing cavitation along seal faces 122, 124 by strategically sizing choke member 138 so that rearward portion 139 is adjacent port 116, to hinder fluid flow through port 116, until faces 122, 124 are spaced a distance apart from one another so that that faces 122, 124 are not subject to the cavitation and/or erosion described above. The valve assembly 110 selectively functions in dual compliant fashion similar to valve assembly of FIG. 1 as described above and maintains a compliant engagement of seal faces 124, 132 by springs 128, 140. Valve assembly 110 is further configured to avoid overstressing the actuation hardware when the valve assembly 110 is subjected to pressure differentials that exceed design and/or anticipated magnitudes.

In a non-limiting example of operation of the valve assembly 100 of FIG. 6, ports 114, 119 are in communication with tubing 60 while ports 116 and 129 are in communication with annulus 70. As shown, a surface area A 127 on a forward side of bulkhead 118 faces and is exposed to compartment 127, and a rearward side of bulkhead 118 has a surface area $A_{142}$ facing and exposed to compartment 142. Surface areas $A_{127}$, $A_{142}$ are strategically sized so that the total force Ft exerted against plug 130 and floating chamber 117 from pressure differences between tubing 60 and annulus 70 is less than that to create damage to actuator stem 146, actuator 156, or other hardware used in actuating valve assembly 110 or otherwise associated with valve assembly 110.

Figure 7:
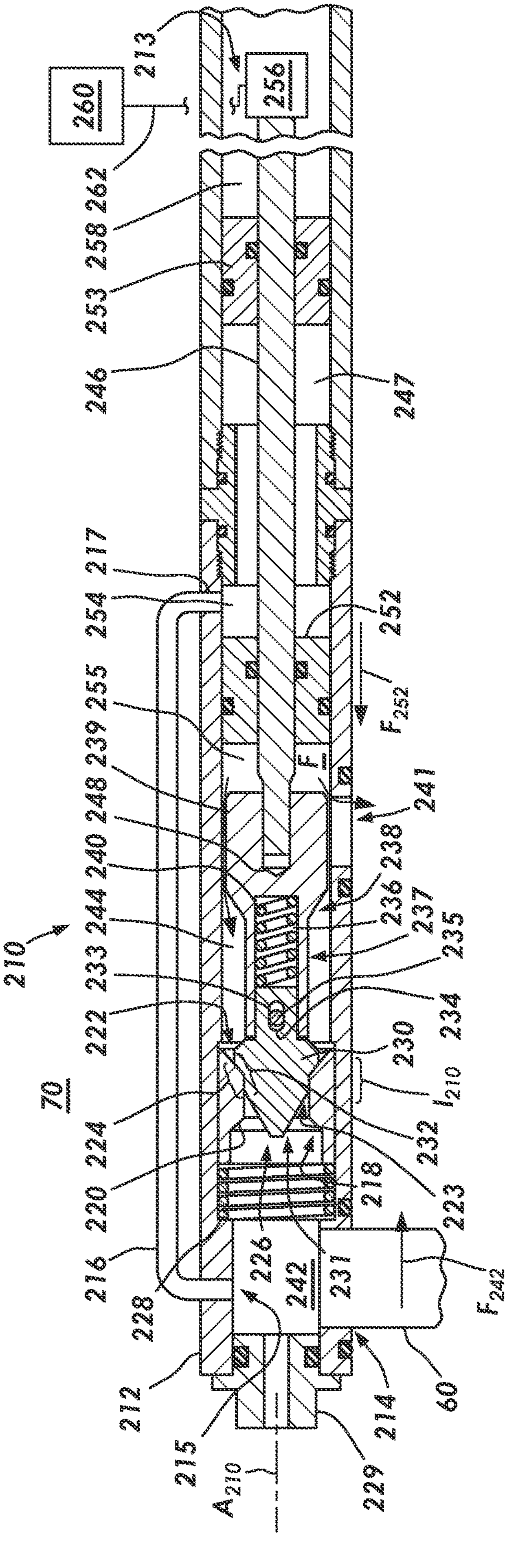
FIG. 7 is a side sectional view of an example of an alternate example of a valve assembly with a locking piston for reducing loads to a valve actuator.

Referring now to FIG. 7, shown in a side sectional view is an example of a valve assembly 210 having an annular valve housing 212 with a chamber or bore 213 that extends along an axis $A_{210}$ of the valve assembly 210. A side port 214 is formed radially through a sidewall of housing 212 that provides communication between bore 213 and tubing 60. In alternatives, side port 214 provides communication between bore 213 and annulus 70. An equalizing port 215 is formed through sidewall of housing 212 shown spaced circumferentially away from side port 214 and in communication with side port 214 across bore 213. An equalizing line 216 connects to port 215 and extends outside housing 212 an axial distance where it connects to another equalizing port 217 formed through the housing 212. Portions of bore 213 adjacent ports 215, 217 are in pressure communication with one another via ports 215, 217 and line 216. An annular seat member 218 is shown coaxially disposed within the bore 213 and spaced axially away from side port 214. Seat member 218 is axially moveable within bore 213 and has an outer surface in sealing contact with an inner surface of housing 212. A portion of seat member 218 proximate port 214 has a radial thickness that remains substantially constant along its length, and at a distance axially away from side port 214 the inner surface of the seat member 218 is profiled obliquely radially inward to define a forward face 220 having a generally frusto-conical configuration. A distance rearward of the forward face 220, the inner surface of seat member 218 is profiled obliquely radially outward to form a rearward face 222 shown having a frusto-conical configuration. A planar section 223 of seat member 218 between the forward and rearward faces 220, 222 has a radial thickness greater than the portion of seat member 218 adjacent the side port 214. A seal face 224 is defined along adjacent portions of the planar portion 223 and rearward face 222. In alternatives, seal face 224 has other profiles, such as a generally spherical profile or other standard configurations. A passage 226 extends axially through the seat member 218.

A spring 228 is shown within bore 213 and in biasing contact with a forward end of seat member 218 opposite rearward face 222. In the example shown, spring 228 and seat member 218 are within a recess formed radially along an inner surface of housing 212. A cylindrical end cap 229 is shown having a portion inserted into an open end of housing 212 on a side of side port 214 opposite spring 228. A flange circumscribes a mid-portion of end cap 229 and that abuts a forward end of housing 212. Valve assembly 210 further includes a conically shaped plug 230 with a forward portion 231 shown inserted within passage 226. A seal face 232 is formed on an outer surface of forward portion 231 that is shaped complimentary to seal face 224, as shown seal faces 224, 232 are in sealing contact with one another to form a sealing interface $I_{210}$ that is a barrier to fluid communication between seat member 218 and plug 230. On a forward end of plug 230 a spindle 233 is provided which projects axially away from forward end 231. A slot 234 is shown formed through spindle 233, slot 234 has an elongate side that extends lengthwise along a portion of spindle 233. A pin 235 is inserted through slot 234 and oriented transverse to axis $A_{210}$ of valve assembly 210. Spindle 233 is a cylindrically shaped member and extends into a recess 236 shown formed axially within a forward portion 237 of a choke member 238. Forward portion 237 is an elongate annular member shown extending lengthwise in the bore 213 and generally aligned with axis $A_{210}$. In an example, pin 235 couples with forward portion 237 and is in interfering contact with slot 234 to retain plug 230 to choke member 238. Forward portion 237 has an outer diameter less than an inner diameter of bore 213. A rearward section 239 of choke member 238 joins an end of forward section 237 distal from plug 230. Rearward section 239 outer diameter increases with distance from forward section 237 to form a frusto-conical portion; past the frusto-conical portion the rearward section 239 is substantially cylindrical and with an outer diameter largely the same as the inner diameter of the bore 213. A spring 240 is in recess 236 and that as shown exerts a biasing force urging the plug 230 axially against seat member 218. A port 241 is shown formed radially through a sidewall of housing 212 and adjacent rearward section 239. A compartment 242 is formed inside bore 213 between plug 229 and interface $I_{210}$. An annular space between the inner surface of housing 213 and outer surface of forward section 237 defines a compartment 244, which extends lengthwise between interface $I_{210}$ and where rearward section 239 transitions from a frusto-conical shape to a cylindrical shape. In the example shown, the interface between rearward section 239 and inner surface of housing 212 is not sealed so that port 241 is in pressure communication with compartment 244. When seal faces 224, 232 are in sealing contact substantially along their respective circumferences, a pressure barrier forms along interface $I_{210}$, which blocks pressure and fluid communication between compartments 242, 244. The example of valve assembly 210 shown in FIG. 7 is in a closed configuration and occurs when opposing seal faces 224, 232 are in sealing contact to form interface $I_{210}$ along the faces 224, 232. As shown interface $I_{210}$ circumscribes the respective inner and outer surfaces of passage 226 and plug 230.

Still referring to FIG. 7, in bore 213 is an elongate actuator stem 246 having a length generally aligned with axis $A_{210}$. An annulus 247 is formed in the radial space between actuator stem 246 and inner surface of housing 212. A forward end of stem 246 inserts into a bore 248 formed partially through rearward section 239, which couples stem 246 to choke member 238; such as by a threaded connection in bore 248, a press fit, welding, bonding, or the like. An annular locking piston 252 and an annular equalizing piston 253 are shown disposed in the annulus 247, equalizing piston 253 is spaced axially rearward of locking piston 252. Seals (shown as O-rings in this example) for pressure isolating forward and rearward ends of pistons 252, 253 are optionally provided on the inner and outer diameters of pistons 252, 253 that form fluid barriers between inner surfaces of pistons 252, 253 and stem 246, and also between outer surfaces of pistons 252, 253 and the inner surface of housing 212. The pistons 252, 253 are slideable along axis $A_{210}$, such as in response to pressure differentials on their opposing end surfaces. Compartments 254, 255 are formed in the annulus 247 respectively between pistons 252, 253, and between piston 252 and rearward section 239. Port 217 is adjacent compartment 254, so that compartment 254 is in pressure communication with compartment 242 via line 216. A motor 256 is shown connected to an end of stem 246 opposite section 239, and which selectively exerts an actuating force onto stem 246. Motor 256 is disposed in a compartment 258 that is optionally filled with a fluid, such as a hydraulic or dielectric fluid.

When in the example of a closed configuration shown in FIG. 7, the valve assembly 210 functions in dual compliant fashion and maintains a compliant engagement of seal faces 224, 232 by springs 228, 240. Valve assembly 210 of FIG. 7 is changed from the closed configuration to an open configuration similar to that shown in FIGS. 2 and 3 as described above. In the open configuration, plug 230 is moved axially rearward so that sealing faces 224, 232 are spaced apart from one another. In an example of changing from a closed to open configuration, motor 256 is energized by electricity from a power source 260 via line 262, which exerts an axial force onto stem 246 causing it to move rearward, and through connection of the stem 246 to the rearward section 239, plug 230 is drawn away from seat member 218 to remove interface $I_{210}$ and extend passage 226 to between sealing faces 224, 232. Extending passage 226 between sealing faces 224, 232, puts compartments 242, 244 in communication via passage 226. When in the open configuration, choke member 238 is moved rearward so that all or a substantial portion of port 241 interfaces directly with compartment 244. Similar to operation of valve assembly 10 described above, fluid from tubing 60 enters valve assembly 210 through port 214, flows into compartment 242, along passage 226, and exits into annulus 70 through port 241. Valve assembly 210 of FIG. 7 similarly has the advantage of reducing cavitation along seal faces 222, 224 by strategically sizing choke member 238 to hinder flow across port 241 until faces 222, 224 are spaced apart from one another.

In an example of operation when port 214 is in communication with production tubing 60, port 241 is in communication with annulus 70, and pressure in production tubing 60 exceeds pressure in annulus 70 ("tubing/annulus pressure differential"), a pressure differential is created between compartments 254, 255. Force $F_{242}$ schematically represents oppositely directed forces resulting from the tubing/annulus pressure differential across the seat member 218 and plug 230, and force $F_{252}$ schematically represents oppositely directed forces resulting from the tubing/annulus pressure differential across piston 252. Force $F_{252}$ urges piston 252 into compartment 255, and without a seal between rearward section 239 and inner surface of housing 212, fluid F is forced from compartment 255, across the interface between section 239 and inner surface of housing 212, and either into compartment 244 or out of bore 213 through port 241. After the fluid F is expelled from compartment 255 and with continued tubing/annulus pressure differential applied across piston 252, piston 252 comes into biasing contact with rearward section 239, which exerts force $F_{252}$ onto choke member 238 in a direction opposite to force $F_{242}$. Creating and applying piston force $F_{252}$ in a direction opposite to force $F_{242}$ locks choke member 238 against rearward movement and reduces forces transmitted to actuator stem 246 and other actuation hardware created by tubing/annulus pressure differential. In the example of FIG. 7, an operational range of valve assembly 210 is expanded to include scenarios when tubing pressure exceed annulus pressure by an amount to generate a force $F_{242}$ which exceeds design limitations or that damages the valve assembly 210. One example of a force $F_{242}$ which exceeds design limitations or damages the valve assembly 210, is a force $F_{242}$ that generates a force in shaft 246 exceeding a yield strength of shaft 246. Examples of damage to the valve assembly 210 include deformation of one or more components of the valve assembly 210. In an alternative, and depending on a designated operational scenario, a radial thickness of piston 242 is adjusted to achieve a designated force $F_{252}$ to counter force $F_{242}$, so that creates forces and/or stresses exerted onto components in the valve assembly 210, due at least in part from force $F_{242}$, remain below the yield strength of these components.

Figure 8A:
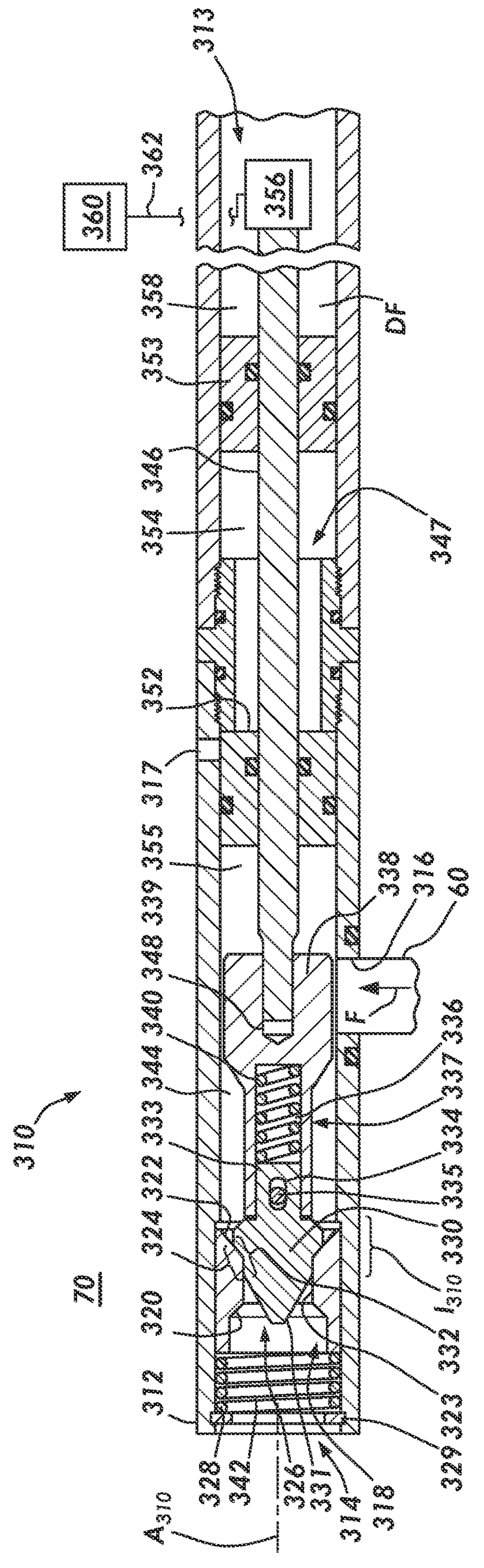
FIGS. 8A and 8B are side sectional views of an example of an alternate example of a valve assembly with a locking piston for reducing loads to a valve actuator.
Figure 8B:
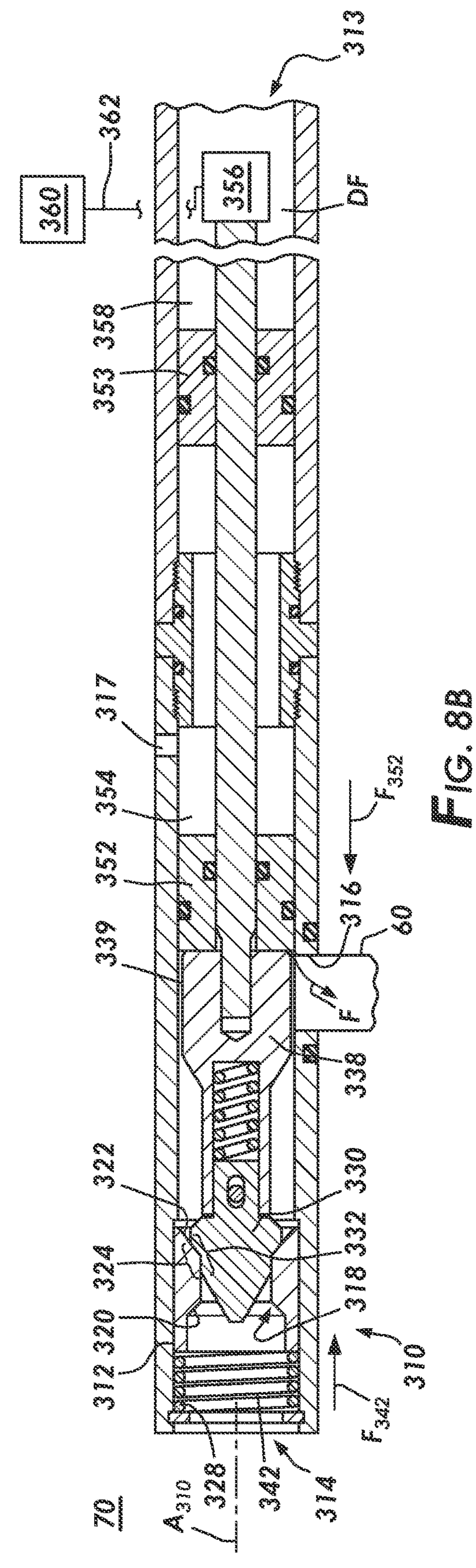

Another example of a valve assembly 310 is shown in side-sectional views in FIGS. 8A and 8B and made up of an annular valve housing 312 having a chamber or bore 313 that extends along an axis $A_{310}$ of the valve assembly 310. A forward end 314 of valve assembly 310 is shown open to the annulus 70, which communicates bore 313 with annulus 70 through forward end 314. Spaced axially rearward from forward end 314 is a flow port 316 formed radially through a sidewall of housing 312 and that is in communication with tubing 60. An equalizing port 317 is formed radially through the sidewall of housing 312 and spaced rearward of flow port 316 and that is open to annulus 70. An annular seat member 318 is shown coaxially disposed within the bore 313 and disposed axially between forward end 314 and flow port 316. Seat member 318 is axially moveable within bore 313 and has an outer surface in sealing contact with the inner surface of housing 312. A portion of seat member 318 proximate end 314 has a radial thickness that remains substantially constant along its length, and at a distance axially away from end 314, the inner diameter of the seat member 318 decreases with distance from end 314, which increases a radial thickness of seat member 318, and that creates a frusto-conical profile on the seat member 318 along the length of increasing thickness. A forward face 320 is formed along the frusto-conical profile. A distance axially rearward of the forward face 320 the radial thickness of seat member 318 reduces along an axial length of seat member 318 to form a rearward face 322, which also has a frusto-conical configuration. Between the forward and rearward faces 320, 322 an inner diameter of seat member 318 is substantially constant to define an annular section 323 that has a radial thickness greater than the portion of seat member 318 distal from rearward face 322. A seal face 324 is defined along adjacent portions of the annular section 323 and rearward face 322. Seal face 324 alternatively has other profiles, such as a generally spherical profile or other standard configurations. A passage 326 extends axially through the seat member 318.

A spring 328 is shown within bore 313 and in biasing contact with an end of seat member 318 proximate end 314. A ring 329 mounted in inner surface of housing 312 on a side of spring 328 opposite seat member 318 provides an axial backstop for spring 328. In the example shown, spring 328 and seat member 318 are within a recess formed radially into an inner surface of housing 312. Valve assembly 310 further includes a plug 330 with a conically shaped forward portion 331 shown inserted within passage 326 and that faces towards open end 314. A seal face 332 is formed on an outer surface of forward portion 331 that is shaped complimentary to seal face 324, as shown seal faces 324, 332 are in sealing contact with one another to form a sealing interface $I_{310}$ that is a barrier to fluid communication between seat member 318 and plug 330. Interface $I_{310}$ circumscribes the respective inner and outer surfaces of passage 326 and plug 330. Valve assembly 310 of FIG. 8A is in a closed configuration when opposing seal faces 324, 332 are in sealing contact. On a rearward end of plug 330 is a spindle 333 shown projecting axially away from forward end 331. A slot 334 is shown formed through spindle 333, which has and elongate side extending lengthwise through spindle 333. A pin 335 is shown inserted into slot 334. Spindle 333 is a cylindrically shaped member having a free end extending into a cylindrically shaped recess 336 that is formed axially within a forward section 337 of a choke member 338. Forward section 337 is an elongate annular member set lengthwise in the bore 313 and generally aligned with axis $A_{310}$. In an example, pin 335 extends radially from within slot 334 and through an opening (not shown) formed in a sidewall of forward section 337 to couple plug 330 with choke member 338. Forward section 337 has an outer diameter spaced radially inward from inner surface of housing 312. Choke member 338 includes a rearward section 339 shown joined to an end of forward section 337 distal from plug 330. Rearward section 339 outer diameter increases with distance from forward section 337 to form a frusto-conical portion; past the frusto-conical portion the rearward section 339 is substantially cylindrical and with an outer diameter largely the same as the inner diameter of the bore 313. A helical elongate spring 340 is shown lengthwise in recess 336 that exerts a biasing force urging the plug 330 against seat member 318. A compartment 342 is defined inside bore 313 between forward end 314 and interface $I_{310}$, and a compartment 344 is formed in the annular space between the inner surface of housing 313 and outer surface of forward section 337, compartment 344 extends axially between interface $I_{310}$ and where rearward section 339 transitions from a frusto-conical shape to a cylindrical shape. In the example shown, the interface between rearward section 339 and inner surface of housing 312 is not sealed so that port 316 is in pressure communication with compartment 344. When seal faces 324, 332 are in sealing contact a pressure barrier is formed along interface $I_{310}$ that blocks pressure and fluid communication between compartments 342, 344.

Still referring to FIGS. 8A and 8B, shown in bore 313 is an elongate actuator stem 346 that is lengthwise generally aligned with axis $A_{310}$. An annulus 347 is formed in the radial space between actuator stem 346 and inner surface of housing 312. A forward end of stem 346 inserts into a bore 348 formed lengthwise and partially through rearward section 339 and in a side opposite forward section 337; and which couples stem 346 to choke member 338, examples of coupling include a threaded connection in bore 348, a press fit, a weld, or integrally formed. A locking piston 352 and a rearward piston 353 are shown as annular members that are disposed in the annulus 347 at axially spaced apart locations. Seals (shown as O-rings in this example) for pressure isolating opposing forward and rearward ends of pistons 352, 353 are optionally provided on the inner and outer diameters of pistons 352, 353 to form pressure and fluid seals between inner surfaces of pistons 352, 353 and stem 346 and outer surfaces of pistons 352, 353 and inner surface of housing 312. The pistons 352, 353 are slideable along axis $A_{310}$, such as in response to pressure differentials on their opposing end surfaces. Compartment 354 is formed in the annulus 347 between pistons 352, 353, and compartment 355 is formed in the annulus 347 between piston 352 and rearward section 339. Compartment 354 is in pressure communication with annulus 70 via port 317. A motor 356 is shown connected to an end of stem 346 opposite section 339, and which selectively exerts an actuating force onto stem 346. An example of a power source 360 is schematically shown connected to motor 356 via a power line 362 for selectively delivering electricity to motor 356 to energize motor 356. Motor 356 is disposed in a compartment 358 that is optionally filled with a fluid, such as a hydraulic or dielectric fluid DF. As piston 353 is axially moveable within housing 312 in response to pressure a differential between compartments 354, 358 and compartment 354 is in pressure communication with ambient via port 317; pressure in compartment 358 is maintained substantially equal to ambient. In this example piston 353 operates as a pressure equalizing piston for equalizing pressure in compartment 358 with pressure in annulus 70.

When in the closed configuration shown in FIGS. 8A and 8B, the valve assembly 310 functions in dual compliant fashion and maintains a compliant engagement of seal faces 324, 332 by springs 328, 340. In an example of changing from a closed configuration shown in FIGS. 8A and 8B, to an open configuration, (such as in FIG. 3), motor 356 is energized by electricity from power source 360 via cable 362, which exerts an axial force onto stem 346 causing stem 346 to move rearward and draw plug 330 away from seat member 318 so that sealing faces 324, 332 are spaced apart from one another, which extends passage 326 to between sealing faces 324, 332 and removes interface $I_{310}$. Without interface $I_{310}$ forming a barrier to fluid flow between faces 324, 332, communication exists between compartments 342, 344 via passage 326. Further rearward movement of choke member 338 spaces choke member 338 away from flow port 316 so that all or a substantial portion of flow port 316 interfaces directly with compartment 344 and choke member 338 is out of interfering contact with fluid F flowing between compartment 344 and tubing across port 316; removing barriers to flow between ports 214, 241 puts the valve assembly 310 into an open configuration.

Referring specifically to FIG. 8A, in the example shown pressure in tubing 60 exceeds pressure in annulus 70, which pressurizes compartment 344 to above that of compartment 342. The resulting pressure differential between compartments 342, 344 generates a resultant force that drives plug 330 against seat member 318 as shown and engages seal faces 324, 332. With seal faces 324, 332 engaged, sealing interface $I_{310}$ is energized to define a barrier in valve assembly 310 to flow between annulus 70 and tubing 60. The embodiment of FIG. 8A depicts dynamic seals that do not require unloading. Further in this example, pressure in compartment 355 exceeds that of compartment 354 creating a pressure differential across opposing end surfaces of locking piston 352 to urge locking piston 352 rearward and away from choke member 338. In this scenario damaging forces from the tubing/annulus pressure differential are avoidable by strategic sizing of the stem 346 diameter in relation to that of the plug 330. When valve assembly 310 of FIG. 8A is moved into the open configuration as described above, fluid F in tubing 60 flows across port 316, into bore 313, through passage 326, into forward end 314, and then to annulus 70.

In the example of FIG. 8B, pressure in annulus 70 exceeds pressure in tubing 60 to define an annulus/tubing pressure differential that in turn creates a pressure differential across piston 352. Forces $F_{342}$, $F_{352}$ schematically represent oppositely directed forces resulting from the annulus/tubing pressure differential across the seat member 318 and plug 330 and piston 352 respectively. This pressure differential urges piston 352 into compartment 355 (FIG. 8A), and without a seal around rearward section 339 fluid F is forced from compartment 355, past section 339, and through port 316—which eliminates compartment 355. With continued annulus/tubing pressure differential applied across piston 352, piston 352 comes into biasing contact with rearward section 339 and exerts force $F_{352}$ onto choke member 338 that is in a direction opposite to force $F_{342}$. Creating piston force $F_{352}$ in a direction opposite to force $F_{342}$ locks choke member 338 from further rearward movement and reduces forces transmitted to actuator stem 346 and other actuation hardware resulting from annulus/tubing pressure differential. In this example piston 352 creates an equalizing and locking force. By applying a reducing countering force to lock rearward movement against stem 346, valve assembly 310 remains functional when pressure in annulus 70 exceeds that of tubing 60 by an amount that might otherwise generate a force $F_{342}$ that exceeds design limitations in stem 346 or other actuation hardware that could be damaging to the valve assembly 310. In an alternative, and depending on a designated operational scenario, a surface area of an end of piston 352 is adjusted to achieve a designated force $F_{352}$.

In an example of operation of the valve assembly 310 of FIG. 8B when in the open configuration, fluid in annulus 70 enters valve assembly 310 through forward end 314, flows into compartment 342, along passage 226, and exits into tubing 60 through port 316. Valve assembly 310 of FIG. 8B has the advantage of reducing cavitation along seal faces 322, 324 by strategically sizing choke member 338 to hinder flow across port 316 until faces 322, 324 are spaced apart from one another.

Figure 9A:
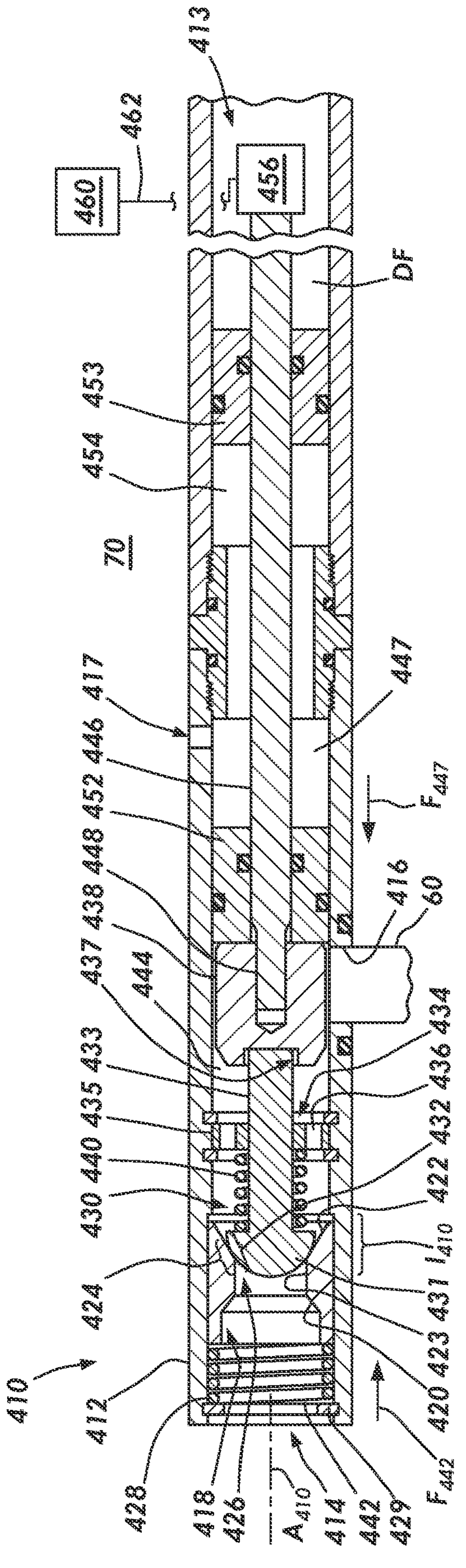
FIGS. 9A-9C are side sectional views of an example of an alternate example of a valve assembly with a locking piston for reducing loads to a valve actuator.
Figure 9B:
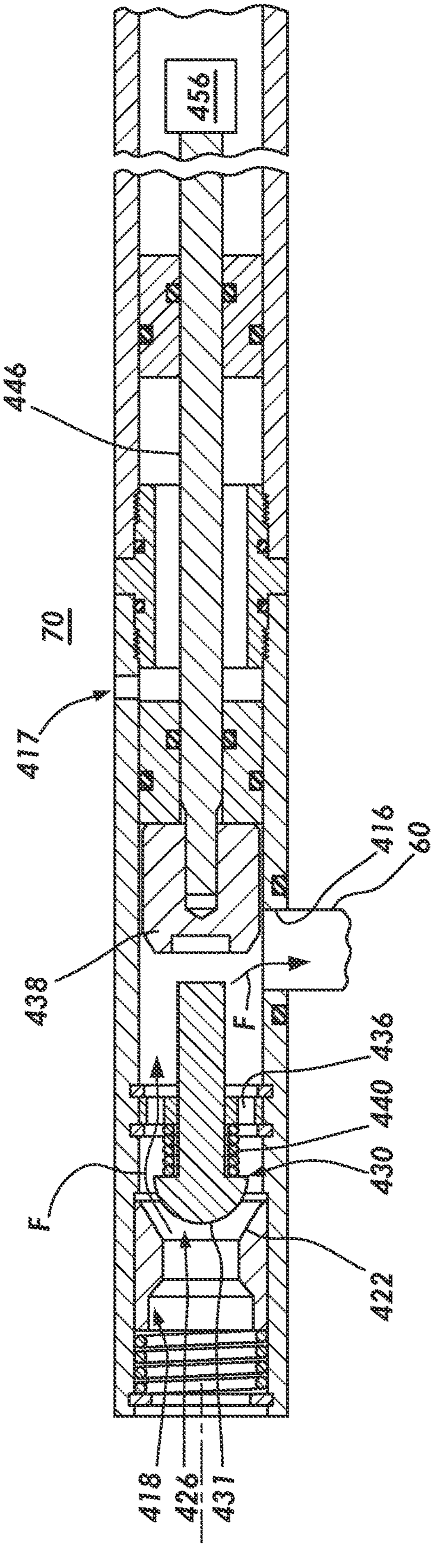
Figure 9C:
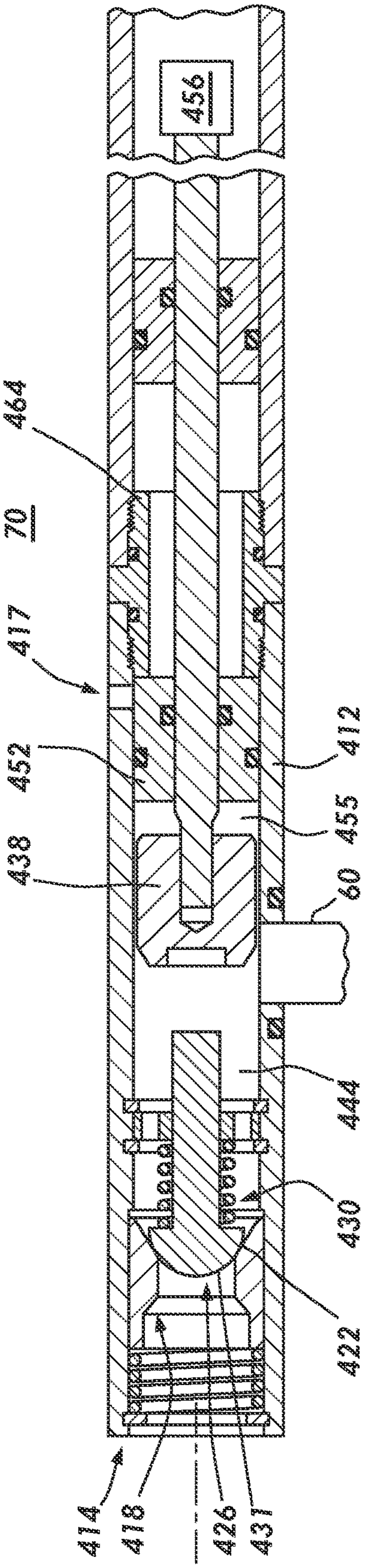

Referring now to FIGS. 9A-9C, which are side sectional views of a valve assembly 410 embodiment that is ambient to the annulus 70, and depict an example of operation. Valve assembly 410 includes an annular valve housing 412 with a chamber or bore 413 that extends along an axis $A_{410}$ of the valve assembly 410. A forward end 414 of valve assembly 410 is shown open to the annulus 70, which communicates a forward portion of bore 413 to annulus 70 through forward end 414. Spaced axially rearward from forward end 414 is a flow port 416 formed radially through a sidewall of housing 412 and that is in communication with tubing 60. An equalizing port 417 is formed radially through the sidewall of housing 412 and spaced rearward of flow port 416 and that is in open communication with annulus 70. An annular seat member 418 is shown coaxially disposed within the bore 413 and disposed axially between forward end 414 and flow port 416. Seat member 418 is axially moveable within bore 413 and has an outer surface that is in sealing contact with the inner surface of housing 412. A portion of seat member 418 proximate end 414 has a radial thickness that remains substantially constant along its length, and at a distance axially away from end 414 the inner diameter of the seat member 418 decreases with distance from end 414 thereby increasing radial thickness of seat member 418 to create a frusto-conical profile on the seat member 418 along the length of increasing thickness. A forward face 420 is formed along the frusto-conical profile. A distance axially rearward of the forward face 420 the radial thickness of seat member 418 reduces along an axial length of seat member 418 to form a rearward face 422, which also has a frusto-conical configuration. Between the forward and rearward faces 420, 422 on seat member 418 is a planar section 423 that has a radial thickness greater than the portion of seat member 318 distal from rearward face 422. A seal face 424 is defined along a portion of rearward face 422 adjacent planar section 423. Seal face 424 alternatively has other profiles, such as a generally spherical profile or other standard configurations. A passage 426 extends axially through the seat member 418.

A spring 428 is shown within bore 413 and in biasing contact with an end of seat member 418 proximate end 414. A ring 429 mounted in inner surface of housing 412 on a side of spring 428 opposite seat member 418 provides an axial backstop for spring 428. In the example shown, spring 428 and seat member 418 are within a recess formed radially along an inner surface of housing 412. Valve assembly 410 further includes a plug 430 having a plug element 431 shown inserted within passage 426. Plug element 431 is shown having a hemispherical shape, and a surface of plug element 431 facing open end 414 is curved; a seal face 432 is on a portion of this surface of plug element 431 and in contact with rearward face 422. Seal faces 424, 432 of FIG. 9A are in sealing contact with one another to form a sealing interface $I_{410}$ that is a barrier to fluid communication between seat member 418 and plug 430. Interface $I_{410}$ circumscribes the respective inner and outer surfaces of passage 426 and plug 430. Valve assembly 410 is in a closed configuration when opposing seal faces 424, 432 are in sealing contact. Mounted on a rearward facing surface of plug element 431 is a cylindrical pedestal 433 shown projecting axially away from plug element 431. Pedestal 433 extends axially through an opening 434 formed through a planar plug mount 435 shown transversely mounted in bore 413. Flowports 436 are shown formed axially through the plug mount 435, which are spaced radially outward from opening 434. A free end of pedestal 433 is shown inserted into a shallow cylindrically shaped recess 437 formed on a forward-facing surface of a choke member 438. As shown, choke member 438 is substantially cylindrical with an optional bevel on its outer circumference proximate its forward end. Rearward of the bevel, choke member 438 has an outer circumference that is in close contact with an inner surface of housing 412. Opposing axial ends of choke member 438 are in pressure and fluid communication with one another along an outer surface of choke member 438. In the example of FIG. 9A choke member 438 is adjacent port 416.

A helical elongate spring 440 is shown circumscribing a lengthwise portion of pedestal 433 adjacent plug element 431 and having a rearward end in abutting contact with plug mount 435. Spring 440 of FIG. 9A exerts a biasing force urging the plug 430 against seat member 418. A compartment 442 is defined inside bore 413 between forward end 414 and interface $I_{410}$, and a compartment 444 is formed in the annular space between the inner surface of housing 413 and outer surface of pedestal 433. In the example shown, fluid and pressure communication exists along the interface between choke member 438 and inner surface of housing 412 so that port 416 is in pressure communication with compartment 444. When seal faces 424, 432 are in sealing contact a pressure barrier is formed along interface $I_{410}$ that blocks pressure and fluid communication between compartments 442, 444.

Further illustrated in FIGS. 9A-9C is an elongate actuator stem 446 set lengthwise in bore 413 and generally aligned with axis $A_{410}$. An annulus 447 is formed in the radial space between actuator stem 446 and inner surface of housing 412. A forward end of stem 446 inserts into a bore 448 formed lengthwise and partially through choke member 438 and in a side opposite recess 437. A forward end of stem 446 couples to choke member 438 inside bore 448, examples of coupling include a threaded connection in bore 448, a press fit, a weld, or integrally formed. Locking piston 452 and rearward piston 453 are shown as annular members disposed in the annulus 447 at axially spaced apart locations. Seals (shown as O-rings in this example) for pressure isolating opposing forward and rearward end surfaces of pistons 452, 453 are optionally provided on the inner and outer diameters of pistons 452, 453 to form pressure and fluid seals between inner surfaces of pistons 452, 453 and stem 446 and outer surfaces of pistons 452, 453 and inner surface of housing 412. The pistons 452, 453 are slideable along axis $A_{410}$, such as in response to pressure differentials between their opposing forward and rearward end faces. Compartments 454 (FIG. 9A), 455 (FIG. 9C) are formed in the annulus 447 respectively between pistons 452, 453 and between piston 452 and choke member 438. Compartment 454 is in pressure communication with annulus 70 via port 417. A motor 456 is shown connected to an end of stem 446 opposite section 439, and which selectively exerts an actuating force onto stem 446. An example of a power source 460 is schematically shown connected to motor 456 via a power line 462 for selectively delivering electricity to motor 456 to energize motor 456. Motor 456 is disposed in a compartment 458 that is optionally filled with a fluid, such as a hydraulic or dielectric fluid DF. Similar to piston 353 of FIG. 8A described above, piston 453 operates to equalize pressure in compartment 358 with ambient and acts as a pressure equalizing piston.

As noted above, compartments 442 and 454 are in pressure communication with annulus 70 and compartment 444 is in pressure communication with tubing 60. In the example illustrated in FIG. 9A, pressure in annulus 70 exceeds pressure in tubing 60 to create pressure differences between compartment 444 and compartments 442, 454 that in turn result in pressure differentials between opposing axial sides of plug 430 and piston 452. The pressure differential across plug 430 creates a force that is directed rearward along axis $A_{410}$, and the pressure differential across piston 452 creates a force that is directed forward along axis $A_{410}$. As shown in FIG. 9A, the stem 446 is positioned to urge choke member 448 against plug 430 with a force that exceeds the rearwardly directed pressure force exerted onto plug 430. In this example, the forward force exerted by piston 452 counters the rearward force from plug 430. The force from motor 456 onto stem 446 also arrests rearward movement of plug 430 to maintain seal faces 424, 432 in sealing contact and keep the valve assembly 410 in the closed configuration. Further shown in FIG. 9A is that the annulus/tubing pressure differential on opposing faces of piston 452 moves piston 452 forward into abutting contact with the choke member 438. When in the closed configuration depicted in FIG. 9A, the valve assembly 410 functions in dual compliant fashion and maintains a compliant engagement of seal faces 424, 432 by springs 428, 440 and the pressure in annulus 70 that pushes seat 418 into plug 430.

Valve assembly 410 of FIG. 9A is changed from the closed configuration to an open configuration (FIG. 9B) by energizing motor 456 with electricity from power source 460 via cable 462, which moves stem 446 and attached choke member 438 away from pedestal 433. A spring constant of spring 440 is strategically designated to be less than a force created by exposing opposing sides of plug 430 to the different pressures in the annulus 70 and tubing 60; which causes spring 440 to compress when choke member 438 is moved away from pedestal 433 to permit rearward movement of plug 430 in response to the annulus/tubing pressure differential. Moving plug 430 away from seat member 418 removes interface $I_{410}$ so that compartments 442, 444 are in communication via passage 426. When in the open configuration choke member 438 is drawn rearward with stem 446 substantially rearward of flow port 416 and out of interfering contact with fluid F flowing between compartment 444 and tubing 60 across port 416. Port 417 in combination with piston 452 generates a counter force $F_{447}$ that opposes forces from annulus/tubing pressure differential to lock choke member 438 against rearward movement and offset damaging effects onto the stem 446 or other actuation hardware.

In the example of FIG. 9C the pressure in tubing 60 exceeds pressure in annulus 70 that forces plug 430 into sealing engagement with seat member 418. In this example plug 430 operates as a check valve. The annulus/tubing pressure differential also urges piston 452 rearward against a collar coupling 464 shown installed between adjacent sections of housing 412. Potentially damaging forces from the annulus/tubing pressure different are not exerted onto the stem 446.

Figure 9D:
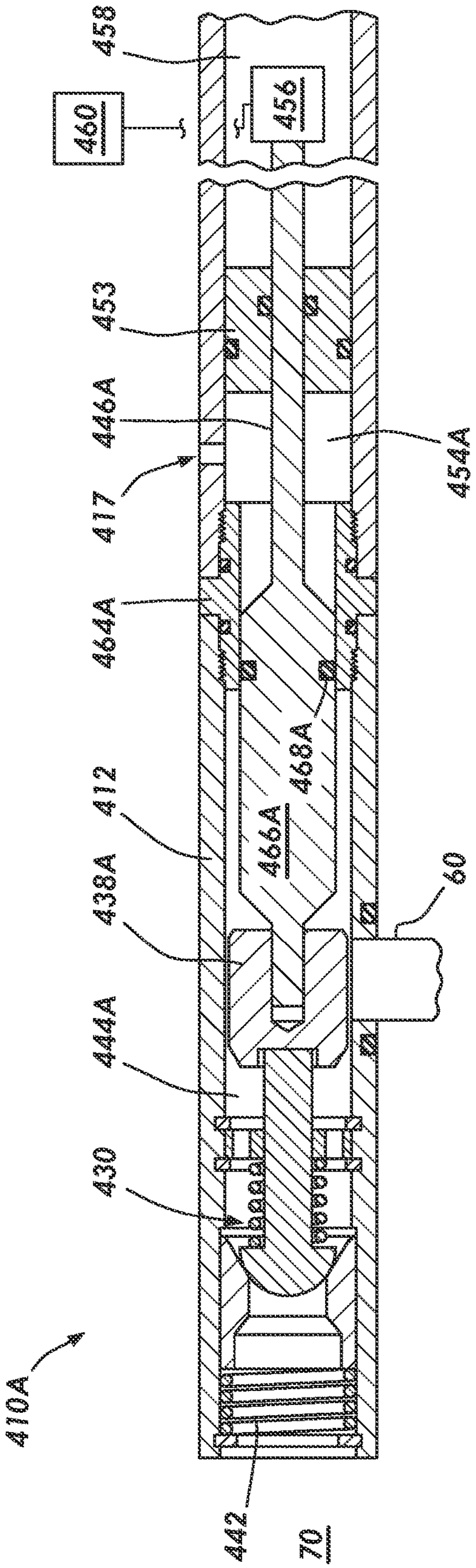
FIGS. 9D-9F are side sectional views of an example of an alternate example of a valve assembly with an actuator having an enlarged stem for reducing loads to a valve actuator.
Figure 9E:
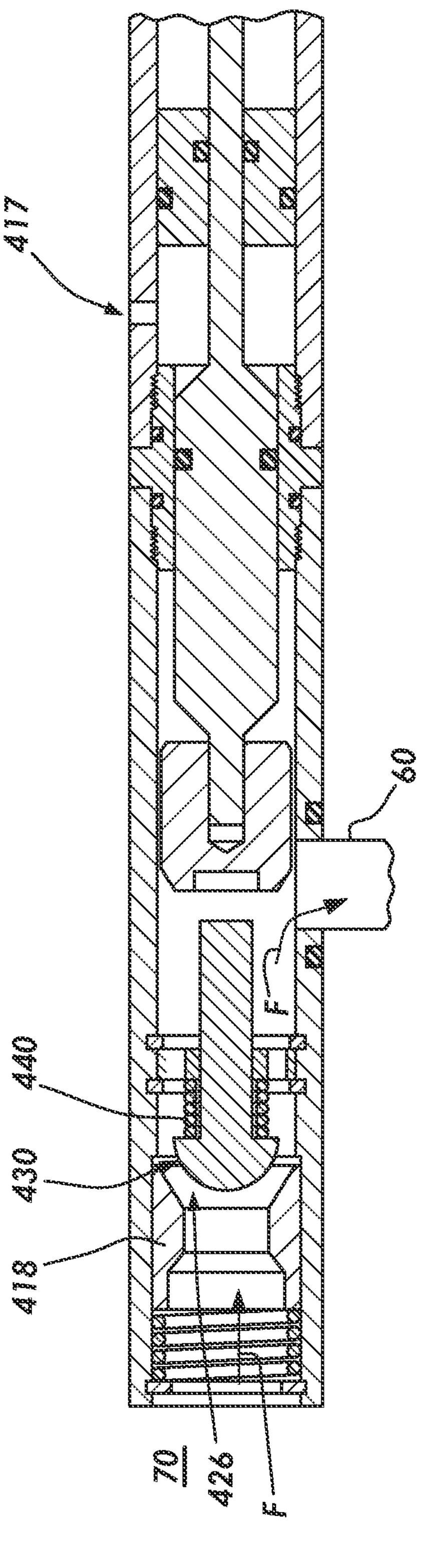
Figure 9F:
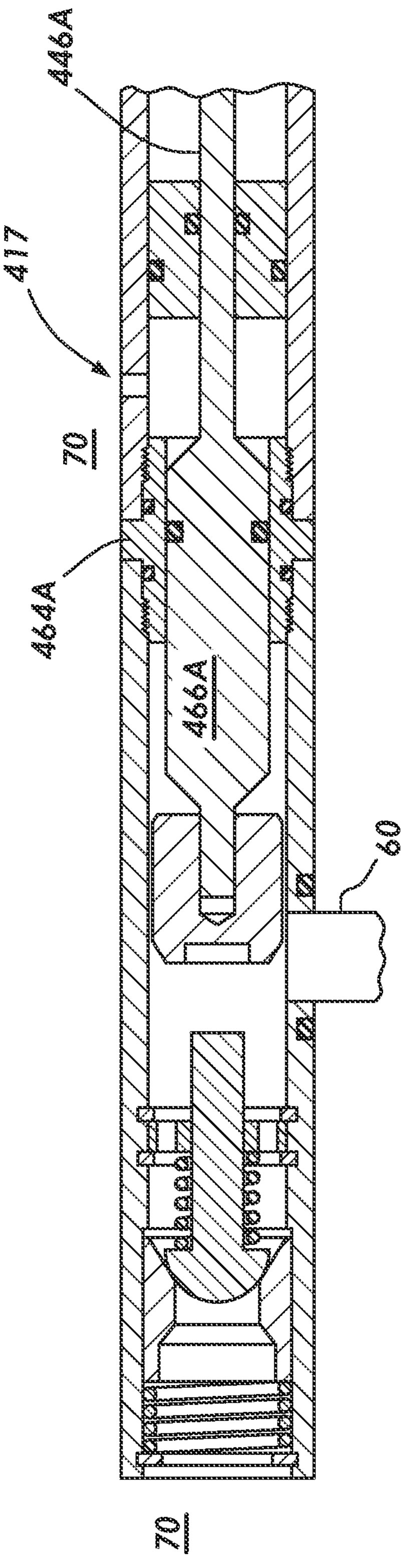

An alternate example of a valve assembly 410A is shown in a side sectional view in FIGS. 9D-9F in which a piston 466A is integrally formed on stem 446A. Piston 466A has an outer surface that extends radially outward from stem 446A and into contact with an inner surface of collar coupling 464. O-ring seals 468A on an outer surface of piston 466A are in sealing contact with inner surface of collar coupling 464 to define a barrier to pressure communication between compartments 444A and 454A. In the example of FIG. 9D pressure in annulus 70 is greater than pressure in tubing 60, and similar to valve assembly 410 of FIG. 9A, valve assembly 410A of FIG. 9D is in the closed configuration due to positioning of the stem 446A. In FIG. 9D, piston 466A and seals 468A are strategically located forward of port 417, which creates a forwardly directed force from the pressure mismatch across seals 468A that counters forces resulting from pressure differential between compartment 442 (same as annulus 70 pressure) and compartment 444A (same as tubing 60 pressure) and locks against rearward movement of choke member 438A.

Referring now to FIG. 9E, here operation is similar to that described in FIG. 9B, that is, the annulus 70 is at a greater pressure than the tubing 60 and the valve assembly 410A is changed to the open configuration by energizing motor 456. Pressure from annulus 70 forces plug 430 rearward and compresses spring 440. This opens passage 426 to provide a pathway for fluid F to flow through valve assembly 410A from annulus 70 into tubing 60.

In the example of FIG. 9F, pressure in tubing 60 exceeds pressure in annulus 70 so that plug 430 is energized into a closed configuration similar to that described above in FIG. 9C. Here, the respective radial dimensions of the piston 466A and collar connector 464A are strategically dimensioned to avoid damaging forces being exerted to the stem 446A or other actuation hardware under anticipated pressure excursions in tubing 60.

Figure 10A:
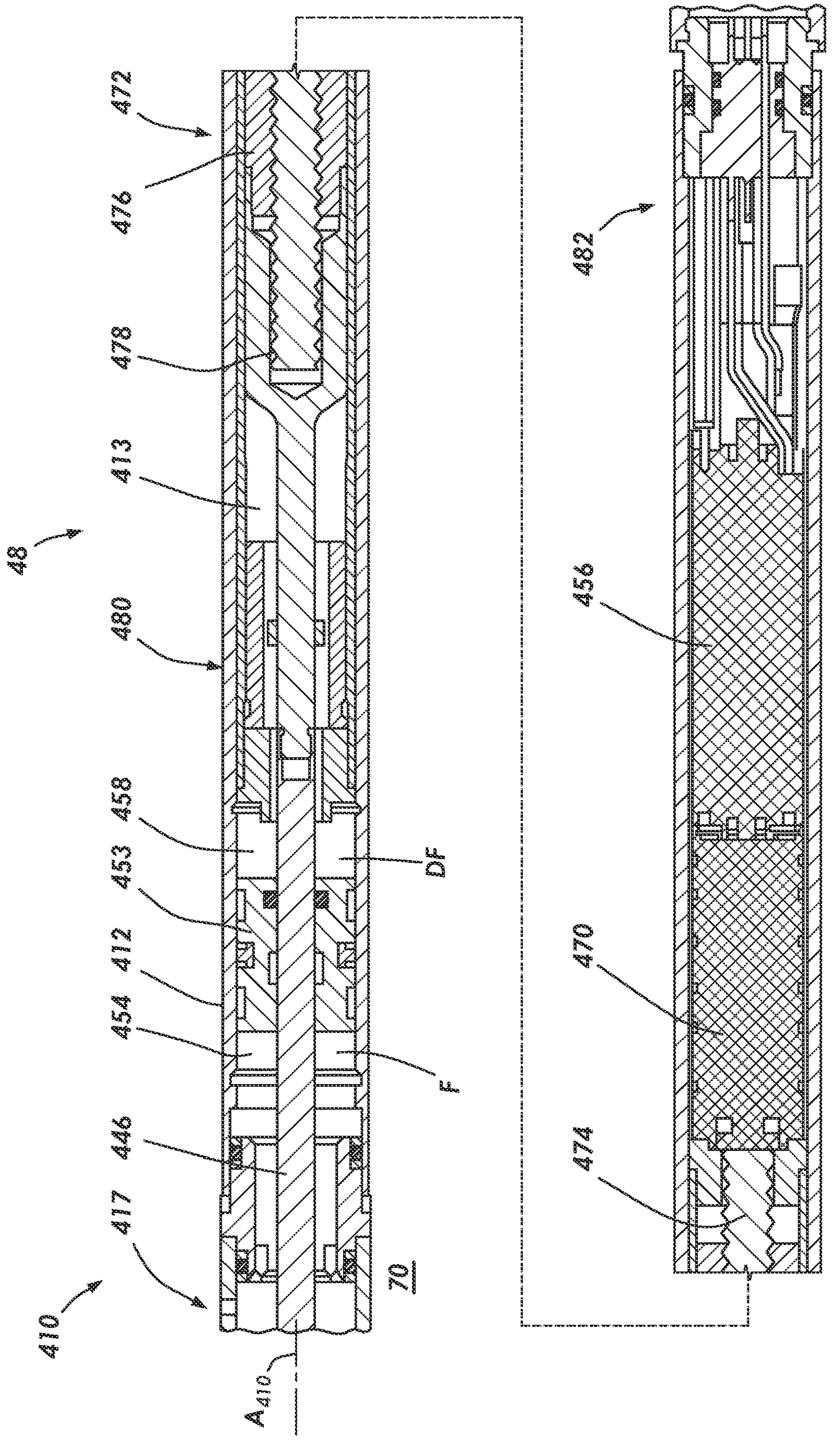
FIGS. 10A and 10B are side sectional views of an example of an alternate example of a valve assembly that equalizes pressure in the actuator to ambient.
Figure 10B:
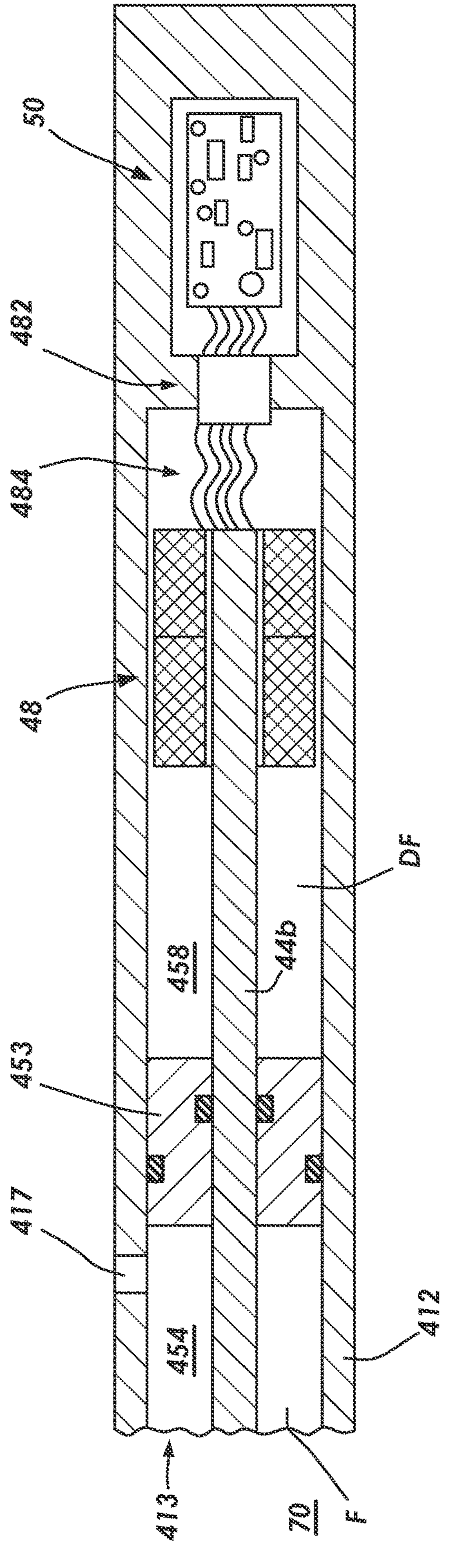

Referring now to FIG. 10A, shown in a side sectional view is an example of a rearward portion of valve assembly 410 illustrating components making up the actuator 48. In this embodiment, actuator 48 includes motor 456, a gearbox 470, and screw drive assembly 472. Gearbox 470 couples to an output of motor 456 and screw drive assembly 472 couples to an output of gearbox 470. In a non-limiting example of operation, gearbox 470 converts to designated values torque and revolutions per minute ("rpm") delivered from an output shaft (not shown) on motor 456. Screw drive assembly 472 includes an elongated lead screw 474, shown disposed in the bore 413 and parallel with axis $A_{410}$, an output of gearbox 470 rotates lead screw 474 at the designated values of rpm and torque. The rotational torque and motion in the lead screw 474 is transferred in the form of linear motion and force to a nut 476 shown circumscribing a portion of lead screw 474. Nut 476 is shown coupled to lead screw 474 via complementary helical flights and grooves formed respectively on lead screw 474 and nut 476. An elongated coupling 478 connects between nut 476 and a rearward end of stem 446 and transfers forces from nut 476 to stem 446 for changing valve assembly 410 between open and closed configurations as discussed above. An optional position sensor 480 is shown inside housing 412 and that circumscribes a portion of coupling 478. On a side of motor 456 opposite gearbox 470 is a penetration 482 that provides a hermetically sealed inlet for an electrical bus 484 (FIG. 10B) to connect between processor 50 and motor 456. In alternatives, penetration 482 also provides a passage for power cable 462 (FIG. 9A) to connect to motor 456.

Referring back to FIG. 10A, piston 453 is shown in bore 413 disposed axially between coupling 478 and port 417. Piston 453 is moveable along axis $A_{410}$ and has inner and outer seals that form barriers to fluid communication axially between forward and rearward ends of piston 453. The inner seal blocks axial communication along an interface between piston 453 and stem 446, and the outer seal blocks axial communication along an interface between piston 453 and inner surface of housing 412. As shown, pressure in annulus 70 is communicated to chamber 454 via port 417, as piston 453 is moveable along axis $A_{410}$, piston 453 is forced by pressure differences between chambers 454, 458 into the chamber 454, 458 having the lower pressure. In a non-limiting example of operation, fluid in chamber 458 (which is shown as dielectric fluid DF) is at about atmospheric pressure when disposed into the well 54 (FIG. 4). As the valve assembly 410 is lowered deeper into the well 54 hydrostatic forces increase pressure in the annulus 70 and chamber 454, which automatically moves piston 453 rearward to exert a compressive force onto the dielectric fluid DF, which correspondingly increases pressure in chamber 458 to equalize with ambient pressure. Similarly, when annulus 70 pressure reduces, such as a lowering of hydrostatic pressure of fluid in annulus 70 or raising the valve assembly 410 to a lower depth in the well 54 (FIG. 4), piston 453 is moved forward in response to the lowered ambient pressure so that pressure in chamber 458 equalizes with pressure in annulus 70.

Advantages of the disclosed valve assembly 410 include that pressure equalization between the actuator 48 and ambient is within the same housing 412 as the actuator 48 and components making up the rest of the valve assembly 410. Moreover, strategic placement of port 417 allows for an equalizing piston 453 that is also substantially coaxial with the housing 412. Integrating equalization capability into the housing 412 eliminates the need for fluid fittings on the housing 412 for connection to external equalizing components, which reduces the size of the valve assembly 410 and sources of fluid leakage. Further advantages of the pressure balancing include removing pressure drive for downhole gases/fluids to contaminate motor, allows for thinner walled actuator housing because it is not pressure bearing, and removes high pressure dynamic seals in the actuator.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. For example, the valve assemblies described herein are optionally used in circulation valves or for general flow such as water injection, production, oil injection, gas production, and the like. In alternatives, the plugs 30, 130, 230, and 330 have outer surfaces that are curved similar to plugs 430 and vice versa; and embodiments of the plugs 30, 130, 230, 330, and 430 include configurations that are planar and/or disk-like, spherical, elliptical, combinations thereof, and other known and later developed shapes. These and other similar modifications will readily suggest themselves to those skilled in the art and are intended to be encompassed within the spirit of the present invention disclosed herein and the scope of the appended claims.

What is claimed is:

1. A system for controlling a flow of fluid comprising:
a valve assembly comprising,
a housing,
a chamber in the housing having an inlet and an outlet,
valve elements in the chamber each having a seal face,
a fluid flow barrier in the chamber formed when seal faces on adjacent valve elements are brought into sealing contact with one another,
forward and rearward compartments in the chamber that are on opposing sides of the fluid flow barrier, and
a locking piston in the chamber having a side in pressure communication with the inlet and an opposing side in pressure communication with the outlet, the locking piston being selectively moved into a locking position into biasing contact against an end of a one of the valve elements that is in communication with the outlet.

2. The system of claim 1, wherein the valve elements comprise a seat member and a plug assembly and wherein the locking piston is biased by a difference in pressure between the inlet and outlet.

3. The system of claim 2, wherein the valve assembly further comprises a stem having an end coupled to an end of the plug assembly.

4. The system of claim 3, further comprising a motor attached to an end of the stem distal from the plug assembly, wherein energizing the motor moves the plug assembly towards and away from the seat member to selectively change the valve assembly between open and closed configurations.

5. The system of claim 4, wherein the stem extends through the locking piston and the locking piston is slidable along the stem.

6. The system of claim 1, further comprising a stem having an end coupled to an end of one of the valve elements that in communication with the outlet, wherein the stem extends through a bore that extends axially through the locking piston, and wherein the locking piston slides along the stem in response to a pressure differential.

7. The system of claim 1, wherein an interface is defined where the plug seal face and seat member seal face are in sealing contact.

8. The system of claim 1, wherein pressure in the inlet exceeds pressure in the outlet.

9. The system of claim 8, wherein the valve assembly further comprises a port formed radially through a sidewall of the housing adjacent the inlet, a port formed radially through the sidewall of the housing on a side of the locking piston distal from the fluid flow barrier, and a line connecting the ports.

10. The system of claim 8, wherein the valve assembly further comprises a port formed radially through the sidewall of the housing on a side of the locking piston distal from the fluid flow barrier, and wherein the inlet and the port are in communication to ambient.

11. The system of claim 1, wherein resilient members are disposed on opposing sides of the seat member and the plug assembly for biasing the seat member and the plug assembly against one another so that the seat member is compliant with the plug assembly.

12. A system for controlling a flow of fluid comprising:

a valve assembly comprising, a housing, a chamber in the housing;

valve elements in the chamber each having a seal face, a barrier in the chamber formed when seal faces on adjacent valve elements are brought into sealing contact with one another, compartments in the chamber that are adjacent one another and on opposing sides of the barrier, the compartments being at different pressures, and a locking piston in a one of the compartments that is at a lower pressure, the locking piston being selectively moved into contact with and biased against an end of a one of the valve elements that is between the locking piston and the barrier, a side of the locking piston being in communication with a fluid flowing into the valve assembly and an opposing side of the locking piston being in communication with a fluid flowing out of the valve assembly.

13. The system of claim 12, wherein the locking piston is biased against the one of the valve elements by a pressure differential between the fluid flowing into the valve assembly and the fluid flowing out of the valve assembly.

14. The system of claim 12, wherein a locking force is applied to the one of the valve elements from the locking piston that offsets an opposing force from a pressure differential that is applied to the one of the valve elements.

15. The system of claim 12, further comprising an actuator and a stem attached to the actuator, wherein the locking piston is intersected by the stem and slideable thereon, and wherein an end of the stem distal from the actuator is in selective abutting contact with the a one of the valve elements, and is selectively moveable away from the a one of the valve elements.

* * * * *